US00RE48457E

(19) United States
(12) Reissued Patent
Goto et al.

(10) Patent Number: US RE48,457 E
(45) Date of Reissued Patent: *Mar. 2, 2021

(54) ELECTRIC WIRE FOR HIGH FREQUENCY, HIGH VOLTAGE AND LARGE CURRENT

(71) Applicant: Goto Denshi Co., Ltd., Sagae (JP)

(72) Inventors: Yoshihide Goto, Sagae (JP); Taiki Goto, Sagae (JP); Youichi Miura, Sagae (JP)

(73) Assignee: GOTO DENSHI CO., LTD., Yamagata (JP)

( * ) Notice: This patent is subject to a terminal disclaimer.

(21) Appl. No.: 15/895,903

(22) Filed: Feb. 13, 2018

Related U.S. Patent Documents

Reissue of:
(64) Patent No.: 8,878,068
Issued: Nov. 4, 2014
Appl. No.: 12/925,690
Filed: Oct. 26, 2010

U.S. Applications:
(63) Continuation of application No. 14/852,244, filed on Sep. 11, 2015, now Pat. No. Re. 46,850, which is an application for the reissue of Pat. No. 8,878,068.

(30) Foreign Application Priority Data

Oct. 26, 2009 (JP) ..... 2009-245345

(51) Int. Cl.
*H01B 7/00* (2006.01)
*H01B 7/30* (2006.01)
*H01F 27/30* (2006.01)
*H01F 5/06* (2006.01)

(52) U.S. Cl.
CPC ..... *H01B 7/0009* (2013.01); *H01B 7/30* (2013.01); *H01F 5/06* (2013.01); *H01F 27/303* (2013.01)

(58) Field of Classification Search
CPC ..... H01B 7/0009; H01B 7/30; H01F 27/303
USPC ..... 174/128.1, 115, 119 R, 126.2; 336/208
See application file for complete search history.

(56) References Cited

U.S. PATENT DOCUMENTS 1,008,370 A * 11/1911 Robillot ..... 174/113 R
3,474,187 A * 10/1969 Maldy et al. ..... 174/125.1
3,622,687 A * 11/1971 Doughty ..... 174/97
3,697,671 A * 10/1972 Parker ..... 174/115
3,723,797 A * 3/1973 Andersson et al. ..... 310/196
(Continued)

FOREIGN PATENT DOCUMENTS

JP H05-15218 U 2/1993
JP 2006-172838 * 6/2006 ..... H01B 5/02
(Continued)

OTHER PUBLICATIONS

Chinese Office Action dated Mar. 19, 2020 in Chinese Application No. 201811137082.9, 13 pages with translation.
(Continued)

*Primary Examiner* — Mlnh Nguyen
(74) *Attorney, Agent, or Firm* — Masuvalley & Partners

(57) ABSTRACT

An electric wire contains a conductive wire having at least a groove structured on the surface of the conductive wire, and an additional wire to be filled into the groove. The groove is provided on an outer surface of the conductive wire along a longitudinal direction of the conductive wire. The additional wire is inserted in the groove.

19 Claims, 25 Drawing Sheets

(56) References Cited

U.S. PATENT DOCUMENTS

| | | | | |
|---|---|---|---|---|
| 3,760,092 | A * | 9/1973 | Woolcock et al. | H01B 12/10 174/15.5 |
| 4,317,955 | A * | 3/1982 | Choi | 174/126.2 |
| 4,321,426 | A * | 3/1982 | Schaeffer et al. | 174/34 |
| 4,883,922 | A * | 11/1989 | Yokota et al. | 505/211 |
| 4,912,444 | A * | 3/1990 | Dederer et al. | 335/216 |
| 4,912,446 | A * | 3/1990 | Singh et al. | 336/62 |
| 5,110,998 | A * | 5/1992 | Muschiatti | 174/24 |
| 5,122,924 | A * | 6/1992 | Okumura | 361/330 |
| 5,571,989 | A * | 11/1996 | Thuries et al. | 174/24 |
| 8,878,068 | B2 | 11/2014 | Goto et al. | |
| 2005/0104708 | A1 | 5/2005 | Goto et al. | |
| 2006/0254801 | A1* | 11/2006 | Stevens | H01B 11/1008 174/102 R |
| 2008/0164050 | A1 | 7/2008 | Kamibayashi et al. | |
| 2011/0095857 | A1 | 4/2011 | Goto et al. | |
| 2017/0294249 | A1 | 10/2017 | Oya et al. | |
| 2018/0315522 | A1 | 11/2018 | Goto et al. | |

FOREIGN PATENT DOCUMENTS

| | | | |
|---|---|---|---|
| JP | 2006-172838 | A | 6/2006 |
| JP | 2007-227264 | A | 9/2007 |
| JP | 2008-053143 | A | 3/2008 |

OTHER PUBLICATIONS

European Communication pursuant to Rules 70(2) and 70a(2) EPC dated Oct. 19, 2020 for. European Application No. 20169135.9, 1 page.

European Search Report dated Jul. 29, 2020 for European Application No. 20169135.9, 9 pages.

* cited by examiner

ELECTRIC WIRE FOR HIGH FREQUENCY, HIGH VOLTAGE AND LARGE CURRENT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

This application claims priority under 35 U.S.C. §119 from Japanese patent application Serial No. 2009-245345, filed Oct. 26, 2009, entitled "Electric wire for high frequency, high voltage and large current", which is incorporated herein by reference in its entirety. *This application is a reissue of the patent application Ser. No. 12/925,690, now U.S. Pat. No. 8,878,068 and it is also a continuation of the reissue application Ser. No. 14/852,244.*

The present invention relates to an electric wire, which is optimal to apply a high-frequency current or high-voltage large current, or optimal to flow a current at a high temperature.

BACKGROUND OF THE INVENTION

Electric vehicles are being put to practical use. It is known that some electric vehicles equip motors that have coils, through which high-frequency currents, such as 200 kHz, flow. Since, this type of motors consumes a lot of electric power, high-voltage large current needs to flow through the coils. However, the motors are driven by electricity supplied from batteries. Thus, there has been a need to reduce electric consumptions of motors. However, it is well known that loss of a high-frequency current is large while the current is flowing through a conducting wire because the current gathers around a surface of the conducting wire due to the skin effect. Therefore, the effective resistance of the conducting wire increases and the loss of electric power also increases. Worse thing is that the temperature of the motor become high such as 100 to 200° C. while the motor is running. Resistances of the traditional electric wires become undesirably high at such temperatures. Thus, higher voltage must be applied to the motor to generate the same mechanical force. This leads a large electric power consumption of the motor.

Litz wires have been commonly used to reduce the electric loss by the skin effect. The litz wire is constituted with bundled plural small-diametered wires, each of which is coated by an insulator. Thereby, the surface area of the litz wire is enhanced. However, since the litz wire is a bundle of the small wires, it is difficult to make the size and shape of the coils precisely homogeneous because the litz wire crumples up while being wound into the coil. Therefore, characteristics and performances of the coils made from the litz wire are not consistent. In addition, since it is difficult to wind the litz wire densely, it is difficult to make a coil from the litz wire that has high performance with a small size. Worsely, since each conducting wire constituting the litz wire has a small diameter, the litz wire is not suitable to apply a high-voltage large current. In order to make the litz wire capable of conducting a high-voltage large current, each conducting wire must have a large diameter. This leads the size of the motor to be large. This adds a weight to an electric vehicle and increases its electric power consumption.

To conquer such problems, there is a conducting wire that has grooves on its outer surface along the longitudinal direction (Japan published utility model application JP H05-15218). This wire has an increased surface area. When a high frequency current is applied to, this wire regulates the increase of effective resistance of the conducting wire caused by the skin effect. However, resistances of this wire still become large when the temperature becomes high. Thus, this wire is still not sufficient to reduce the electric consumption of the motors.

Recently cordless inductive power supply system has been getting popular to charge batteries of cellular phones. This system is also expected to be a future charging method for electric vehicles. This system enables to charge a battery without connecting a wire. The cordless inductive power supply system is composed of a transmitter and a receiver. To charge, a high-frequency high-voltage current is applied to the transmitter. When the receiver is close enough (but not in contact or wired), an electric power is transmitted to a receiver and a battery connected to the receiver is charged. To maximize the transmission efficiency, electric properties of electric wires such as impedance and inductance in the transmitter and receiver are critical. Currently, manufacturers produce the inductive power supply systems by their own format. Thus, in order to produce compatible transmitters and receivers, electric wires must be modified for each manufacturer. However, it costs a lot to develop electric wires for each manufacturers. Thus, an electric wire whose electric properties is easily attenuated is desired.

SUMMARY OF THE INVENTION

One aspect of the present invention is an electric wire containing a conductive wire and an additional wire. The additional wire is inserted in the conductive wire along a longitudinal direction of the conductive wire.

Another aspect of the present invention is an electric wire containing a conductive wire and an insulator. The conductive wire has substantially a quadrilateral cross-sectional shape. The insulator is placed along a longitudinal direction of the conductive wire at a corner of the quadrilateral.

Another aspect of the present invention is an electric wire containing a conductive wire. A resistance of the conductive wire at 200° C. is at most 1.42 times larger than a resistance of the conductive wire at 50° C.

DETAILED DESCRIPTION OF THE INVENTION

Below, best modes of the present invention are explained with the drawings.

<First Embodiment>

Figure 1:
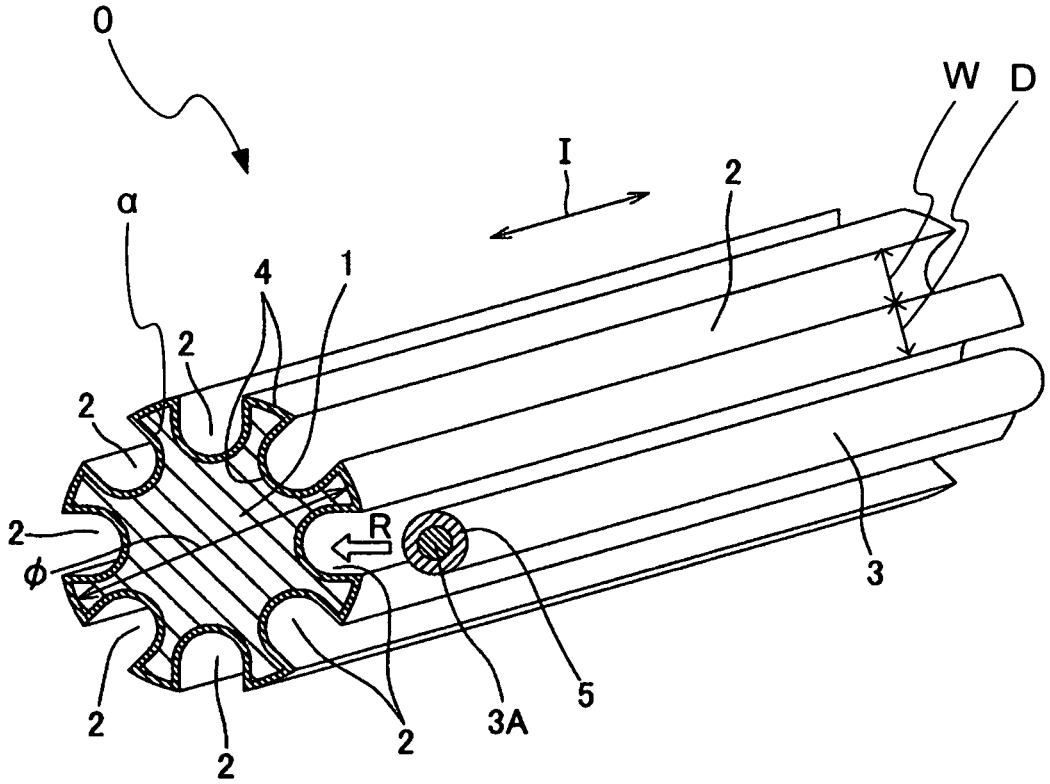
FIG. 1 depicts a perspective view of a first embodiment of an electric wire.

As shown in FIG. 1, an electric wire 0 is composed of a conductive wire 1. On an outer surface of the conductive wire 1, grooves 2 are formed in a longitudinal direction I. Furthermore, the conductive wire 1 is covered by an insulator sheath 4.

In this embodiment, additional electric wires 3 are arranged to be inserted into the grooves 2. A cross-sectional shape of the additional electric wire 3 fits to that of the groove 2. The additional electric wire 3 is composed of a conductive member 3A. The conductive member 3A is covered by an insulator sheath 5.

The conductive wire 1 has a substantially circular cross-sectional shape. The conductive wire 1 is preferably made of copper, aluminum, silver or iron. In this embodiment, the conductive wire 1 is made of a conductive material containing copper. Since copper has a high conductivity, it efficiently reduces the electrical loss. Iron offsets an undesirable Eddy current. Thus, when the electric wire 0 containing iron is used for a coil, it can generate a larger magnetic power. The optimal diameter Φ of the conductive wire 1 is 0.2 mm -50 mm.

Figure 2:
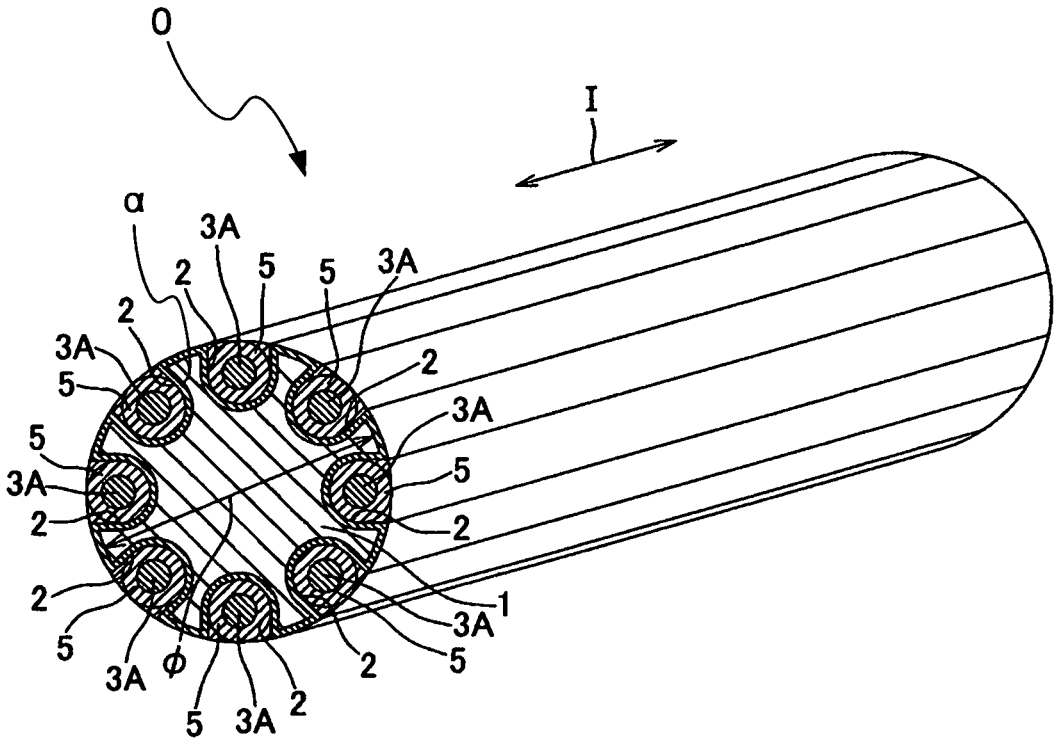
FIG. 2 depicts a perspective view of the first embodiment of the electric wire in which additional electric wires are inserted into a conductive wire.

On the outer surface of the conductive wire 1, the plural grooves 2 are provided. In the case of FIGS. 1 and 2, eight grooves 2 are provided. In the first embodiment, a cross-sectional shape of the groove 2 is substantially elliptic. This elliptic shape increases the surface area of the conductive wire 1. Thereby, the effective resistance and electric power loss by the conductive wire 1 is reduced. Therefore, the electric wire 0 is optimal for conducting a high-frequency current regardless of the size of the load. Furthermore, in the cross-sectional view, a bottom shape of the groove 2 is round. When the additional electric wire 3, whose cross-sectional shape is circular, is used for the electric wire 0, the round shape improves the adherence of the additional electric wire 3 to the groove 2. In this embodiment, an angle "α" at a junction formed by a top end of the groove 2 and an end of the outer surface of the conductive wire 1 is less than 90°. This arrangement effectively prevents the additional electric wire 3 from coming out of the groove 2. As shown in FIG. 1, in this embodiment, a width D of the outer surface of the conductive wire 1 between the grooves 2 is smaller than a width W of the grooves 2. This configuration makes portions of the conductive wire 1 between the grooves 2 more flexible. Thus, the additional electric wires 3 can be more easily inserted into the grooves 2.

The insulator sheath 4 covers the conductive wire 1. The insulator sheath 4 is preferably made of synthetic resin or rubber. These materials provide an excellent electric insulation even if the insulator sheath 4 is made thinner. Furthermore, these materials add water repellency and elasticity. Thus, the insulator sheath 4 made of these materials enables tighter insertion of the additional electric wires 3 into the groove 2.

A cross-sectional shape of the additional electric wire 3 is circular. In this embodiment, since the bottom of the groove 2 has a round shape, the additional electric wire 3, whose outer surface is round, fits well to the groove 2, and hence the adhesiveness between the additional electric wire 3 and the groove 2 is improved. As shown in FIG. 2, it is preferable that a width of the groove 2 is substantially the same as a diameter of the additional electric wire 3. This arrangement efficiently prevents the additional electric wire 3 from coming out from the groove 2. Furthermore, it is preferable that a depth of the groove 2 is substantially the same as the diameter of the additional electric wire 3. This makes the outer surface of the electric wire 0 smoother. Hence, the electric wire 0 can be wound more densely to form a coil. The conductive member 3A of the additional electric wires 3 is preferably made of copper, aluminum, silver or iron. In this embodiment, the conductive member 3A is made of a conductive material containing aluminum. Since aluminum is relatively more flexible, it is easier to put the additional electric wire 3 into the groove 2. Furthermore, like this embodiment, if the material of the conductive member 3A and the material of the conductive wire 1 are different, it is easy to adjust or modify electrical characteristics of the electric wire 0 by adding or removing the additional electric wires 3. When the conductive member 3A is made of iron, it is easier to offset an undesirable Eddy current generated in the electric wire 0.

The insulator sheath 5 covers the conductive member 3A. The insulator sheath 5 is preferably made of synthetic resin or rubber. These materials provide an excellent electric insulation even if the insulator sheath 5 is made thinner. Furthermore, these materials add water repellency and elasticity. Thus, the insulator sheath 4 made of these materials enables tighter insertion of the additional electric wire 3 into the groove 2. It is preferable that the insulator sheath 4 and the insulator sheath 5 are made of the same material. This arrangement improves the adherence of the insulator sheath 4 and the insulator sheath 5.

In order to insert the additional electric wire 3 into the groove 2, the additional electric wire 3 put over the groove 2 is pressed toward the center R of the conductive wire 1 along the longitudinal direction by a pressing means such as a roller. Thereby, shapes of the insulator sheath 4 and the insulator sheath 5 are changed by their elasticity so that the shape of the additional electric wire 3 and the shape of the groove 2 fit to each other. As shown in FIG. 2, it is desirable that the additional electric wire 3 does not project over the outer surface of the conductive wire 1. In other word, it is desirable that the entire wire 3 fits inside of the groove 2. This enables the electric wire 0 to be aligned neatly. In addition, this secures the insulation of the conductive wire 1 and the additional electric wire 3. Therefore, the conductive wire 1 and the additional electric wire 3 can conduct high-frequency current and high-voltage current stably and efficiently. In other embodiment, the additional electric wire 3 may be adhered to the groove 2 by an adhesive. In other embodiment, the additional electric wire 3 may be welded to the groove 2 by high-frequency wave or by ultrasonic wave. Furthermore, in other embodiment, an additional insulator sheath 5 may be filled in a gap between the additional electric wire 3 and the groove 2 after the additional electric wire 3 is inserted into the groove 2.

The electric wire 0 of the first element has the structure described above. Since the grooves 2 are provided on the outer surface of the conductive wire 1 along the longitudinal direction I, the surface area of the conductive wire 1 increases and the effective resistance and the electrical power loss decrease. Therefore, the electric wire 0 can optimally conduct currents to or in a motor in an automobile, a battery of a cellular phone, a transformer for an organic electroluminescent device or a light emission diode devices, and cordless inductive power supplies, regardless of the size of the load.

Furthermore, in the first embodiment, the plural grooves 2 are provided on the outer surface of the conductive wire 1 along the longitudinal direction I. Since the groove 2 has an substantially elliptic cross-sectional shape, the conductive wire 1 has a small transverse cross-sectional area and is compact. However, the surface area of the conductive wire 1 is enhanced and its effective resistance is reduced. Hence, the electrical power loss by the conductive wire 1 is reduced.

In order to supply a current to a high load such as a motor of an automobile through the electric wire 0, a diameter of the conductive wire 1 does not have to be large unlike litz wire. Because the surface area of the conductive wire 1 is large, the conductive wire 1 can transmit a high-frequency current and a high-voltage large current stably without being large-diametered. Since the diameter Φ of the conductive wire 1 does not have to become large, the motor can be compact and it contributes to reduce the weight of an automobile.

In this embodiment, since the conductive wire 1 is made of a conductive material containing copper, the effective resistance of the conductive wire 1 is reduced and its electrical power loss is reduced. Thus, the conductive wire 1 can transmit the high-frequency current efficiently.

In this embodiment, since the conductive wire 1 is covered by the insulator sheath 4 made of synthetic resin or rubber, the conductive wire 1 is well electrically insulated.

By putting the additional electric wires 3 in the grooves 2, characteristics of the electric wire 0 is modified. When it is necessary to use cords, plugs and terminals specified by auto manufacturers to charge batteries of cars, by using the electric wire 0, it is possible to make the current capacities and supplied currents constant and to make the charging time constant. Therefore, by using the electric wire 0, it is not necessary to prepare several kinds of chargers. The electric wire 0 can provide the same advantage for charging batteries of cellular phones when plug cord terminals and chargers are specified by the manufacturers.

Furthermore, by inserting the additional electric wires 3 into the grooves 2, the total surface area of the electric wire 0 can be increased. Therefore, the effective resistance of the electric wire 0 decreases and the electric power loss is also reduced. Therefore, the electric wire 0 can optimally transmit high-frequency currents or high-voltage large currents for motors of automobiles and cellular phones, regardless of the size of the load.

In the embodiment 1, the additional electric wires 3 are put in all the grooves 2. However, all the grooves 2 do not have to be filled with the additional electric wires 3. The number of the additional electric wires 3 put into the grooves 2 are adjusted based on necessity. Since the electric wire 0 is easy to change the number of the additional electric wires 3, it is easy to adjust the electric properties of the electric wire 0 such as impedance and inductance. Therefore, the electric properties of the electric wire 0 are easily set for cordless inductive power supply systems provided by various manufacturers.

Since the additional electric wires 3 are covered by the insulator sheaths 5 made of synthetic resin or rubber, the additional electric wires 3 are well electrically insulated. Therefore, the electric wire 0 has an excellent insulation characteristic as a whole, and thus the electric wire 0 has a high safe-profile.

<First Modification Example> and <Second Modification Example>

Figure 3:
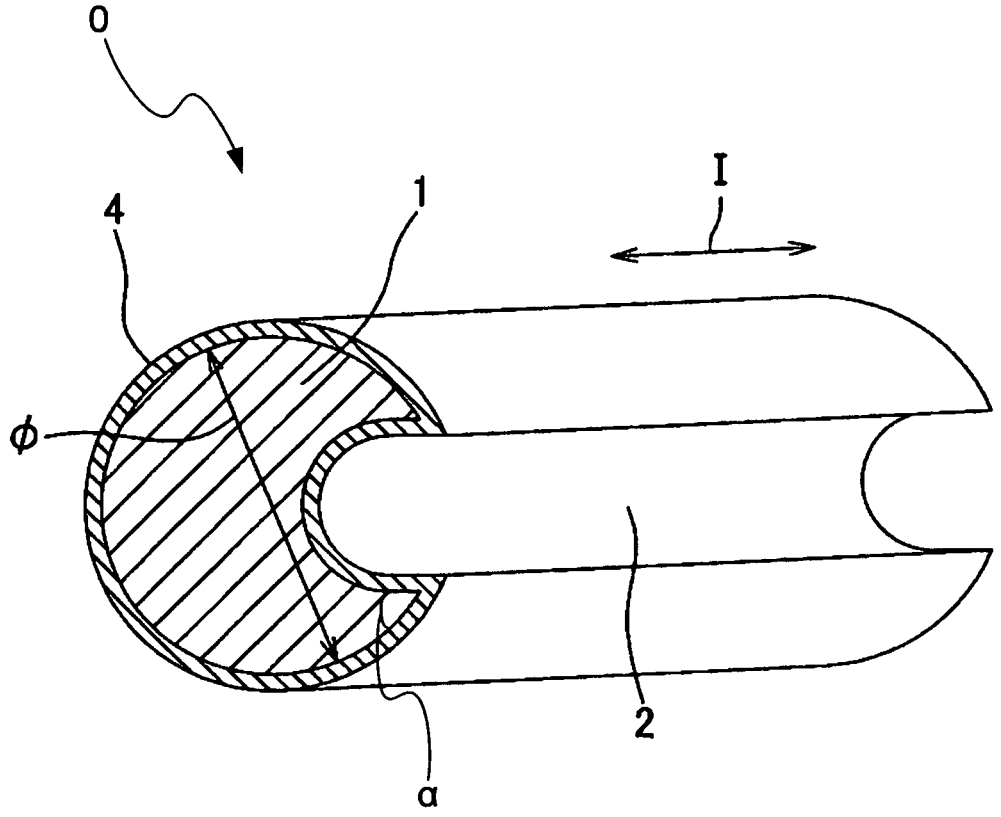
FIG. 3 depicts a perspective view of a first modification example of the first embodiment.
Figure 4:
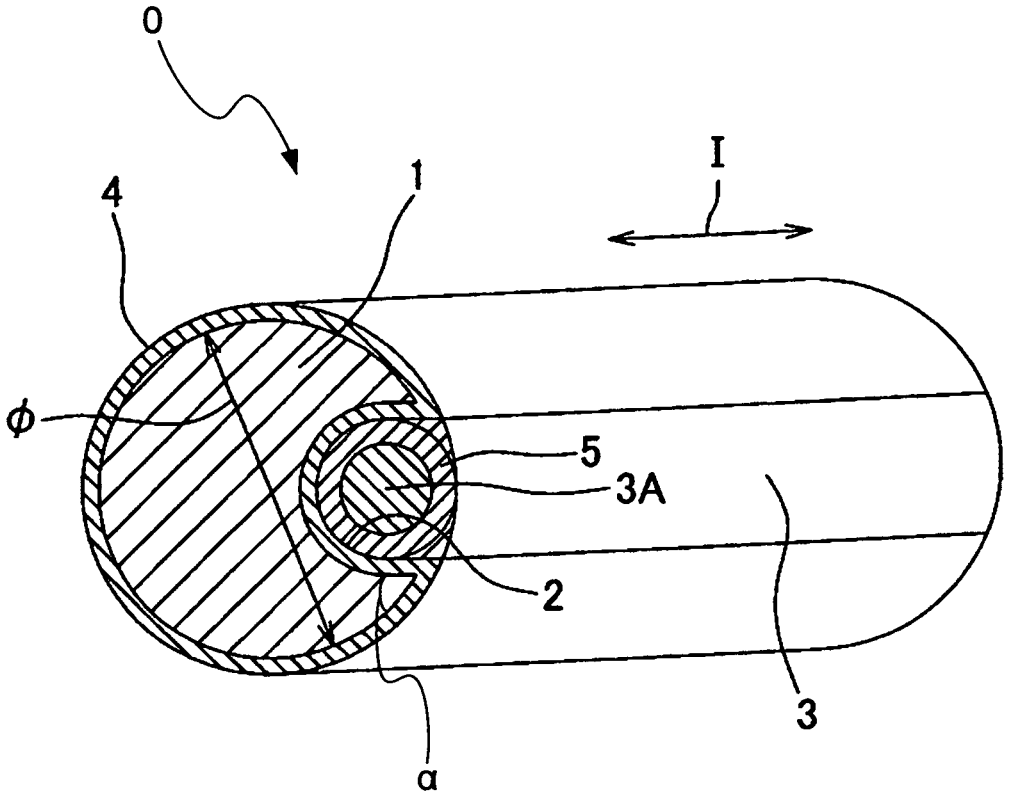
FIG. 4 depicts a perspective view of the first modification example in which an additional electric wire is inserted into a conductive wire.
Figure 5:
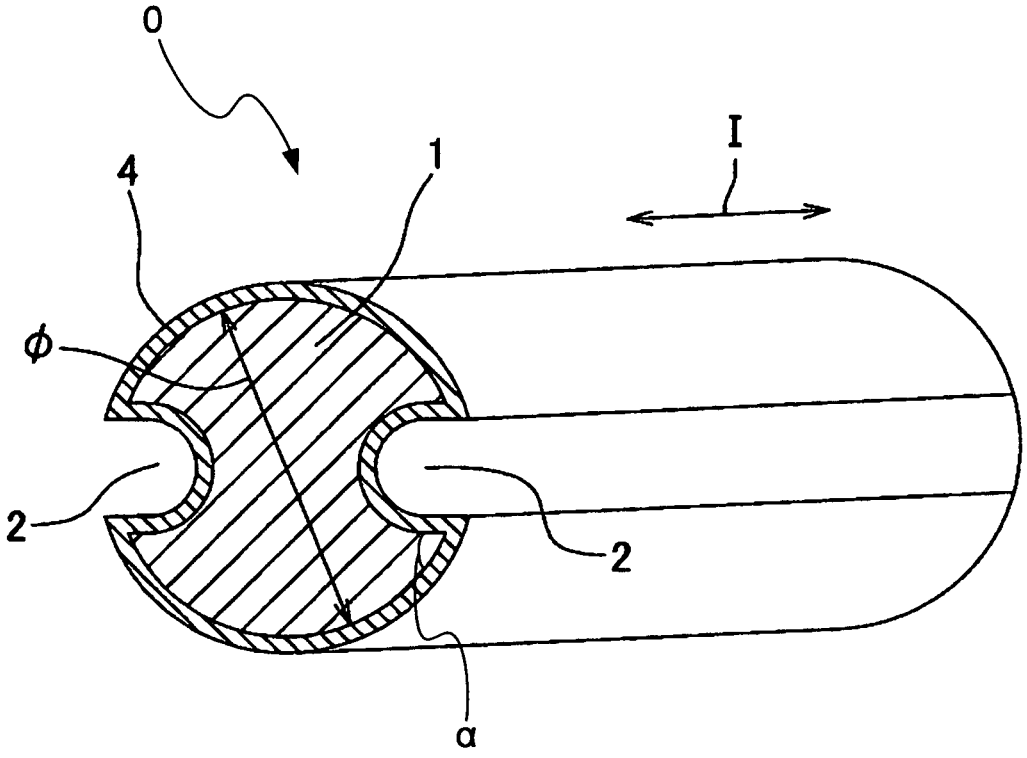
FIG. 5 depicts a perspective view of a second modification example of the first embodiment.
Figure 6:
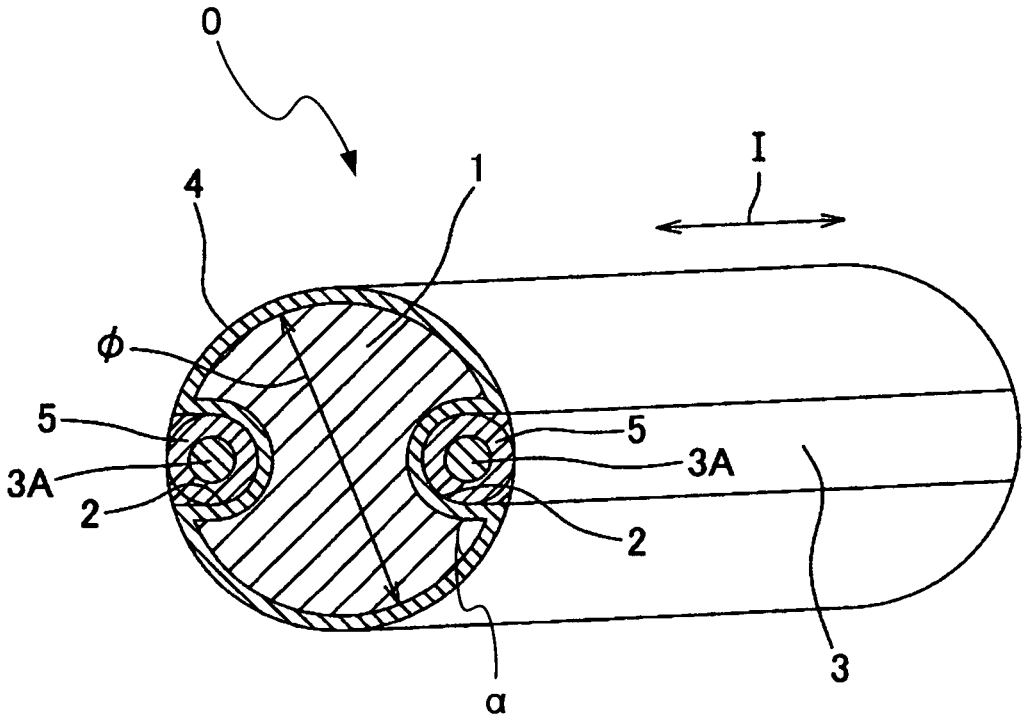
FIG. 6 depicts a perspective view of the second modification example in which additional electric wires are inserted into a conductive wire.

FIGS. 3 and 4 show a first modification example of the first embodiment. In the first modification example, one groove 2 is provided on an outer surface of the conductive wire 1, whose cross-sectional shape is substantially circular, along the longitudinal direction I. One additional electric wire 3 is inserted into the groove 2. FIGS. 5 and 6 show a second modification example of the first embodiment. In the second modification example, two grooves 2 are provided on an outer surface of the conductive wire 1 along the longitudinal direction I so that both are positioned as bilaterally symmetric. Two additional electric wires 3 are inserted into the grooves 2.

Even in these modification examples, the surface area of the conductive wire 1 is enhanced. Thus, even though its cross-sectional area is small and the conductive wire 1 is compact, its effective resistance and its electrical power loss are reduced. Therefore, the electric wire 0 can optimally transmit high-frequency currents or high-voltage large currents for motors of automobiles and cellular phones, regardless of the size of the load. Furthermore, the electric wire 0 can conduct high-frequency and high-voltage current stably without making the wire diameter Φ large unlike the litz wire. Therefore, the electric power consumption of the motor can be reduced and the size of the motor can be made smaller. Thus, it prevents an automobile from being heavier. When it is necessary to use cords, plugs and terminals specified by auto manufacturers to charge batteries of cars, by using the electric wire 0, it is possible to make the current capacities and supplied currents constant and to make the charging time constant. Therefore, by using the electric wire 0, it is not necessary to prepare several kinds of chargers. The electric wire 0 can provide the same advantage for charging batteries of cellular phones when plug cord terminals and chargers are specified by the manufacturers.

<Second Embodiment>

Figure 7:
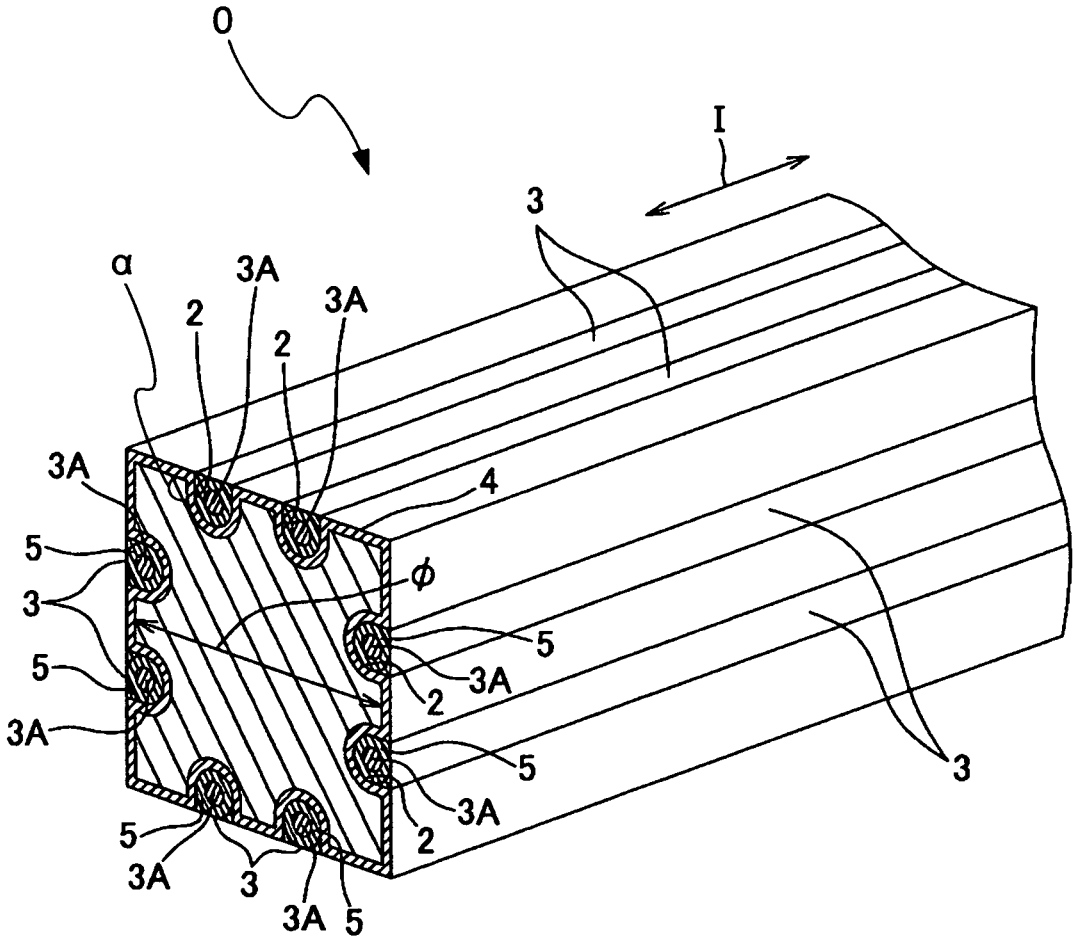
FIG. 7 depicts a perspective view of a second embodiment of an electric wire.
Figure 8:
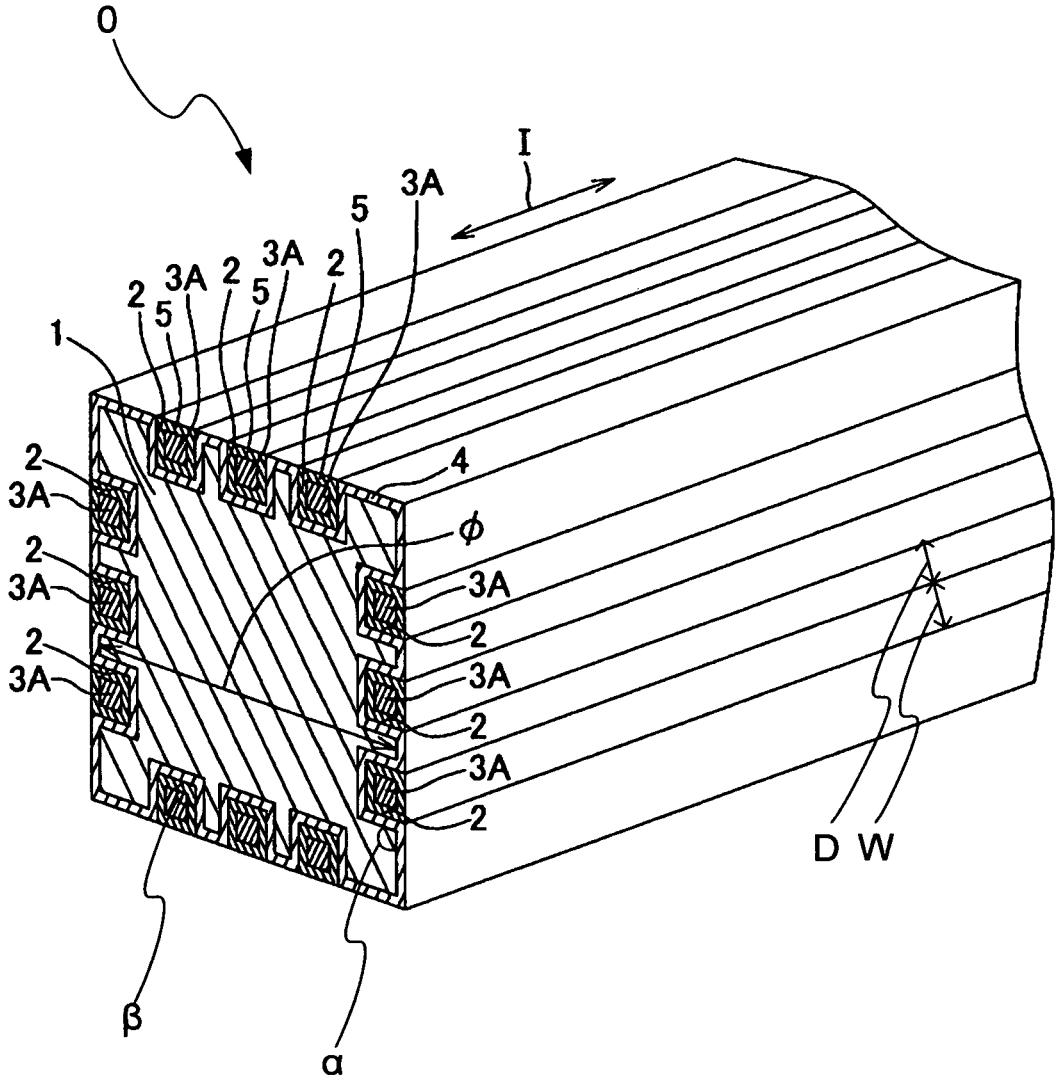
FIG. 8 depicts a perspective view of a first modification example of the second embodiment.

FIG. 7 shows a second embodiment of the present invention. In the second embodiment, a cross-sectional shape of the conductive wire 1 is substantially square. And, a transverse cross-sectional shape of the groove 2 is substantially half ellipse. FIG. 8 shows a first modification example of the second embodiment. In the first modification example, a cross-sectional shape of the conductive wire 1 is substantially square. Furthermore, a transverse cross-sectional shape of the groove 2 is substantially square. Likewise, a transverse cross-sectional shape of the additional electric wire 3 is also substantially square. If the transverse cross-sectional shape of the additional electric wire 3 is quadrilateral, it is easier to make the outer surface of the electric wire 0 flat after the additional electric wire 3 is inserted into the groove 2. In this respect, it is desirable that the height of the additional electric wire 3 is the almost same as the depth of the groove 2. In addition, it is desirable that the width of the additional electric wire 3 is almost the same as the width of the groove 2. This arrangement more efficiently prevents the additional electric wire 3 from coming off from the groove 2. In this embodiment, an angle "α" at a junction formed by a top end of the groove 2 and an end of the outer surface of the conductive wire 1 is substantially 90°. This angle still makes it harder for the additional electric wires 3 to come off from the grooves 2. In the first modification example, an angle "β" at a junction formed by a side wall of the groove 2 and a bottom surface of the groove 2 is also substantially 90°. This angle has a good balance between easily inserting the additional electric wire 3 into the groove 2 and between preventing the additional electric wire 3 from coming off from the groove 2. As shown in FIG. 8, in the first modification example, a width W of the outer surface of the conductive wire 1 between the grooves 2 is smaller than a width D of the grooves 2. A conductive wire 1, whose cross-sectional shape is rectangular, can be produced for example by referring Japan patent JP 3523561 and JP 3390746.

In the second embodiment, since the conductive wire 1 has an substantially square shape, a larger number of the grooves 2 can be formed on the outer surface of the conductive wire 1 and hence a larger number of the additional electric wires 3 can be put on the electric wire 0. Therefore, the electric wire 0 can conduct even a larger current. Furthermore, since the electric wire 0 has a square shape, it can increase a fill factor. In other words, the electric wires 0 can fill a space more densely with reduced dead spaces. Since the groove 2 has an substantially elliptic cross-sectional shape, the surface area of the conductive wire 1 is enhanced with a reduced cross-sectional area. The electrical characteristics of the electric wire 0 are easily altered by adding the additional electric wires 3 to the conductive wire 1. When it is necessary to use cords, plugs and terminals specified by auto manufacturers to charge batteries of cars, by using the electric wire 0, it is possible to make the current capacities and supplied currents constant and to make the charging time constant. Therefore, by using the electric wire 0, it is not necessary to prepare several kinds of chargers. The electric wire 0 can provide the same advantage for charging batteries of cellular phones when plug cord terminals and chargers are specified by the manufacturers.

Figure 9:
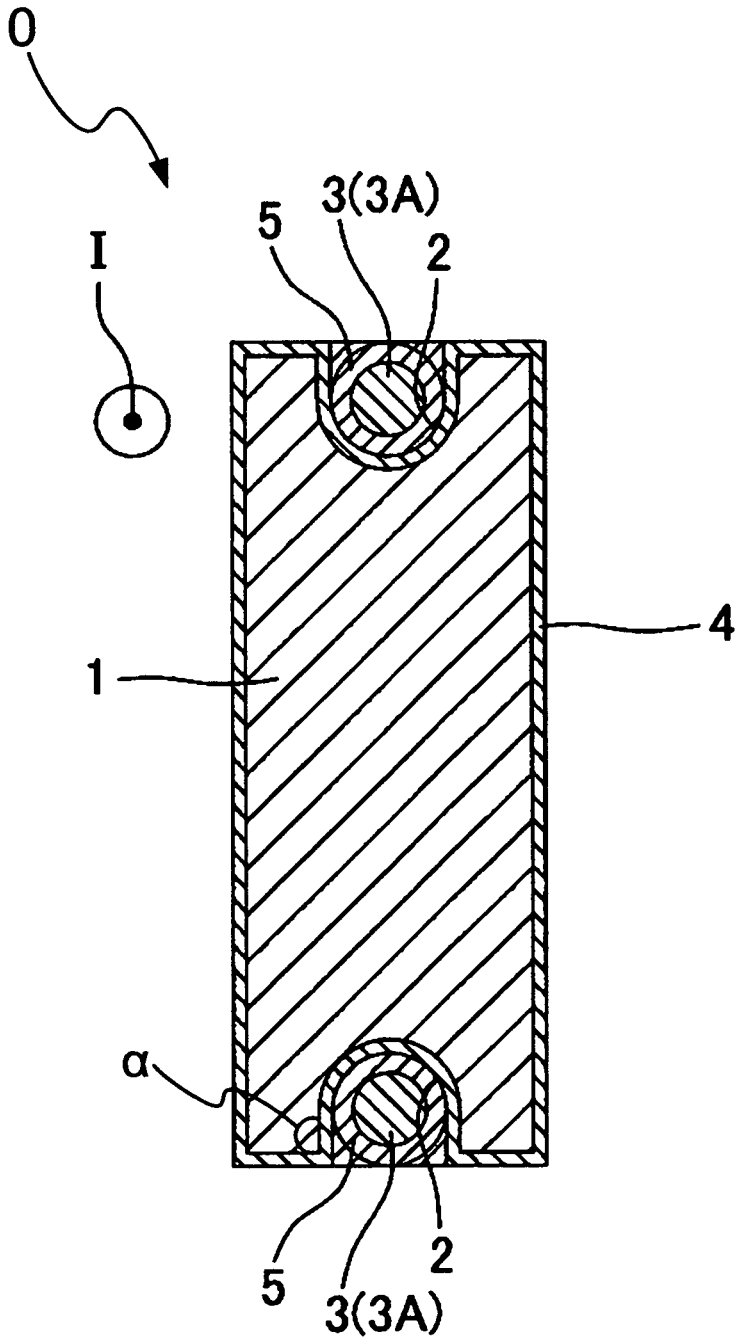
FIG. 9 depicts a transverse cross-sectional view of a second modification example of the second embodiment.
Figure 10:
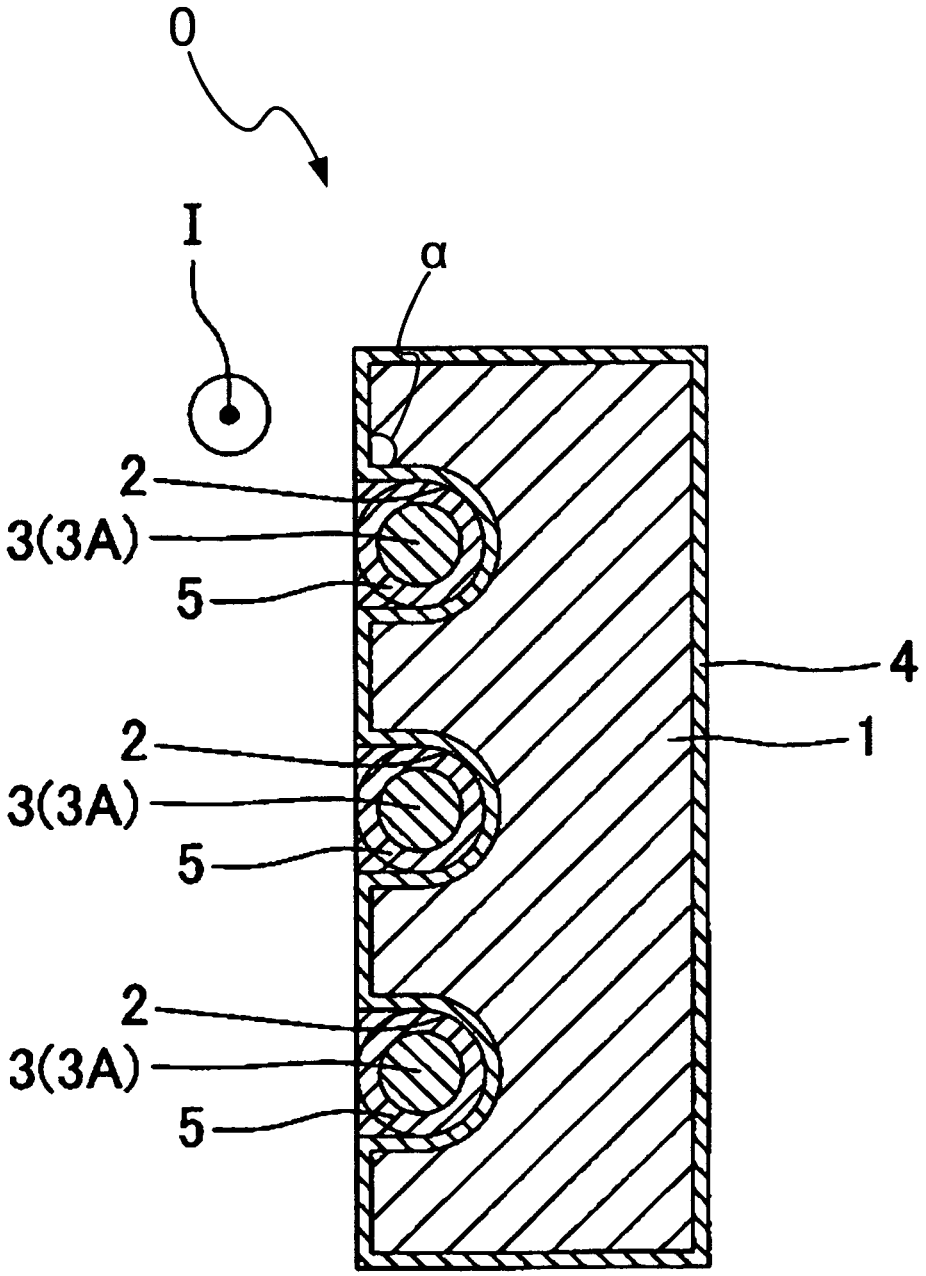
FIG. 10 depicts a transverse cross-sectional view of a third modification example of the second embodiment.
Figure 11:
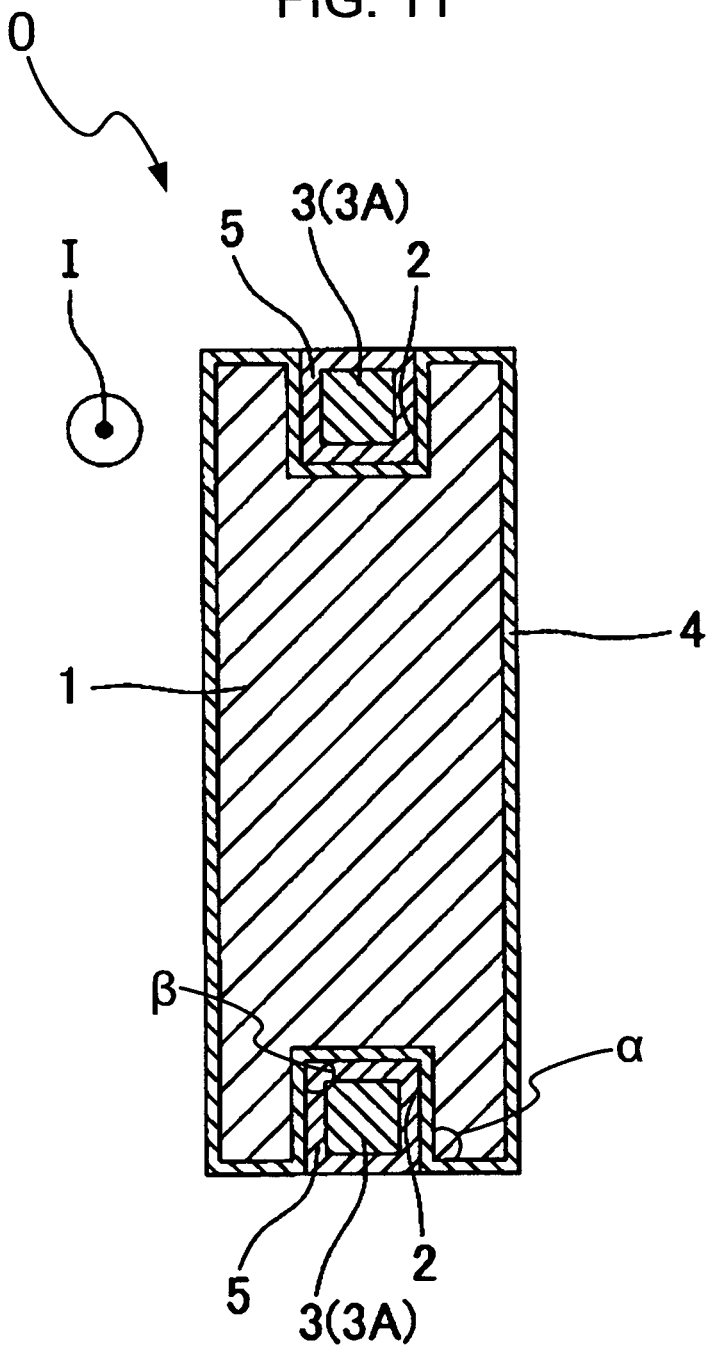
FIG. 11 depicts a transverse cross-sectional view of a fourth modification example of the second embodiment.
Figure 12:
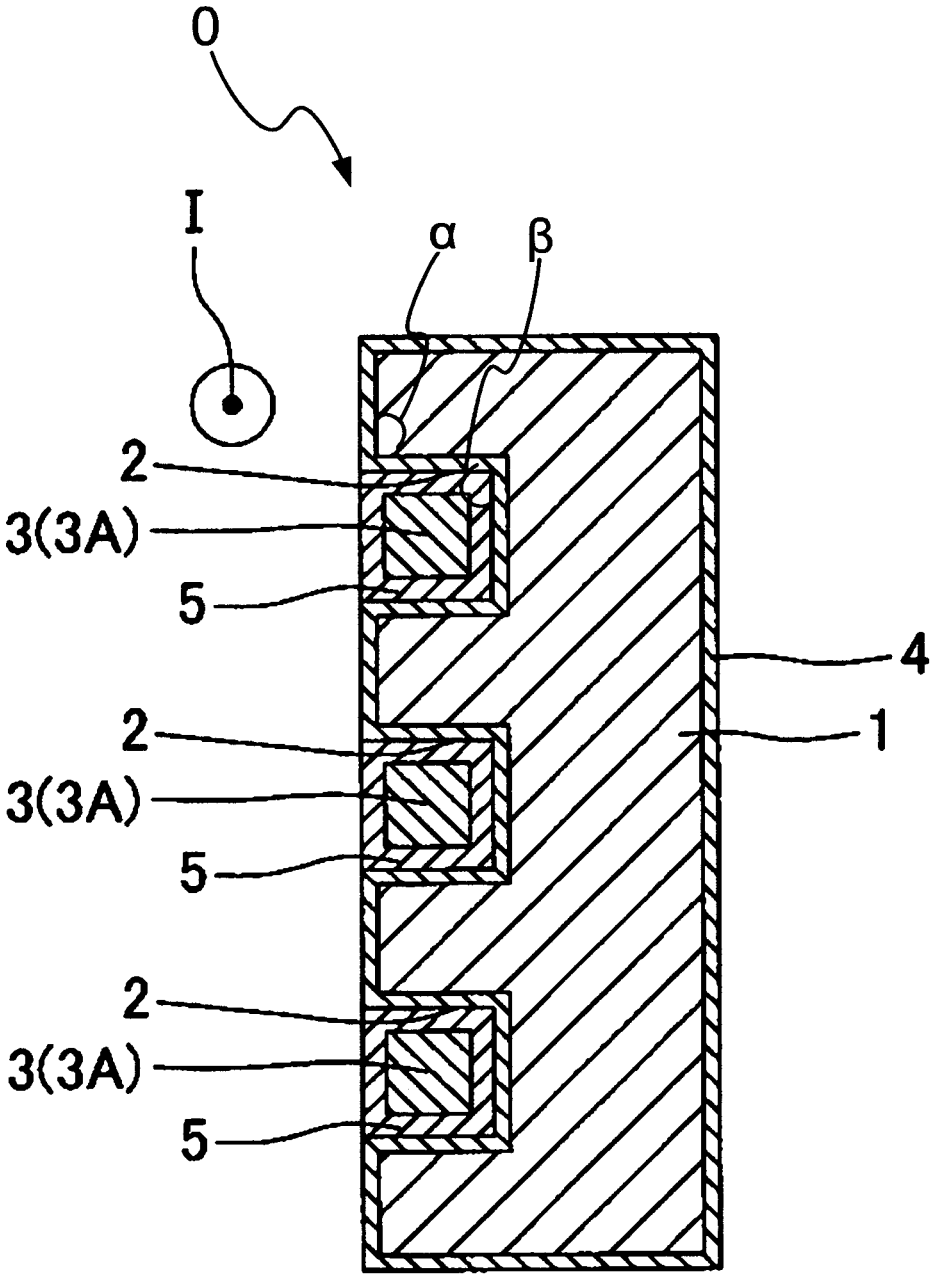
FIG. 12 depicts a transverse cross-sectional view of a fifth modification example of the second embodiment.

FIG. 9 shows a second modification example of the second embodiment. FIG. 10 shows a third modification example of the second embodiment. FIG. 11 shows a fourth modification example of the second embodiment. FIG. 12 shows a fifth modification example of the second embodiment. The conductive wires 1 of the second to fifth examples have rectangular transverse cross-sectional shapes. In the second modification example shown in FIG. 9, one groove 2, whose transverse cross-sectional shape is substantially half ellipse, is provided on each short-edge side of the conductive wire 1 in cross-sectional view. And, an additional electric wire 3, which has a circular transverse cross-sectional shape, is inserted into each groove 2. In the third modification example shown in FIG. 10, three grooves 2, whose transverse cross-sectional shapes are substantially half ellipse, are provided on one long-edge side of the conductive wire 1 in cross-sectional view. And, an additional electric wire 3, which has a circular transverse cross-sectional shape, is inserted into each groove 2. In the fourth modification example shown in FIG. 11, one groove 2, whose transverse cross-sectional shape is substantially square, is provided on each short-edge side of the conductive wire 1 in cross-sectional view. And, an additional electric wire 3, which has a square transverse cross-sectional shape, is inserted into each groove 2. In the fifth modification example shown in FIG. 12, three grooves 2, whose transverse cross-sectional shapes are substantially square, are provided on one long-edge side of the conductive wire 1 in cross-sectional view. And, an additional electric wire 3, which has a square transverse cross-sectional shape, is inserted into each groove 2.

The conductive wires 1 of the second to fifth examples have same advantages as those of the first embodiment. Furthermore, the conductive wires 1 of the second to fifth examples have larger fill factor than the conductive wire 1 of the first embodiment. The electric wires 0 shown in FIGS. 9 and 11 are particularly flexible when bent toward the long edge of the electric wire 0 (right and left direction in FIGS. 9 and 11). When the electric wire 0 shown in FIGS. 10 and 12 are placed on an object so that the outer surface of the conductive wire 1 on which the grooves 2 are formed touches a surface of the object, the additional electric wires 3 becomes extremely stable so as not to come out from the grooves 2.

In the above embodiments, one additional electric wire 3 was provided in one groove 2. In other embodiment, plural additional electric wires 3 may be provided in one groove 2. Furthermore, such additional electric wires 3 may be bundled. Such configuration realizes high fill factor, and such electric wire 0 does not have to be large-diametered to conduct high-frequency large current unlike litz wire. Accordingly, such electric wire 0 can transmit a high-frequency current and a high-voltage large current stably without big electric power loss. Since the diameter 1 of the conductive wire 1 does not have to become large, the motor can be compact and it contributes to reduce the weight of an automobile.

By putting the additional electric wires 3 in the grooves 2, characteristics of such electric wire 0 can also be modified. When it is necessary to use cords, plugs and terminals specified by auto manufacturers to charge batteries of cars, by using the electric wire 0, it is possible to make the current capacities and supplied currents constant and to make the charging time constant. Therefore, by using the electric wire 0, it is not necessary to prepare several kinds of chargers. The electric wire 0 can provide the same advantage for charging batteries of cellular phones when plug cord terminals and chargers are specified by the manufacturers.

In the above embodiments, the conductive wire 1 was made of copper and the conductive member 3A was made of aluminum. In other preferred embodiment, the conductive wire 1 can be made of silver or aluminum and the conductive member 3A can be made of copper. Such electric wire 0 also provides excellent conductivity of high-frequency current. In addition, it is easy to adjust the electric property of the electric wire 0. In other embodiment, the conductive wire 1 can be formed from copper, aluminum or silver. Also, the conductive member 3A can be formed from copper, aluminum or silver. Furthermore, the conductive wire 1 and the conductive member 3A may be made of other conductive materials.

In the above embodiments, cross-sectional shapes of the conductive wires 1 were substantially circular, square or rectangular. However, such shapes can be modified to be any shape including any quadrilateral shape. Cross-sectional shapes of the grooves 2 in the above embodiments were substantially half ecliptic or square. However, such shapes can be modified to be any shape. Also, cross-sectional shapes of the additional electric wires 3 can be any shape other than circular or square. Furthermore, the numbers of the grooves 2 and the additional electric wires 3 can be set any numbers other than the above embodiments. Likewise, size or diameter Φ of the conductive wire 1, the groove 2 and the additional electric wire 3 can be modified upon actual use.

<Third Embodiment>

Figure 13:
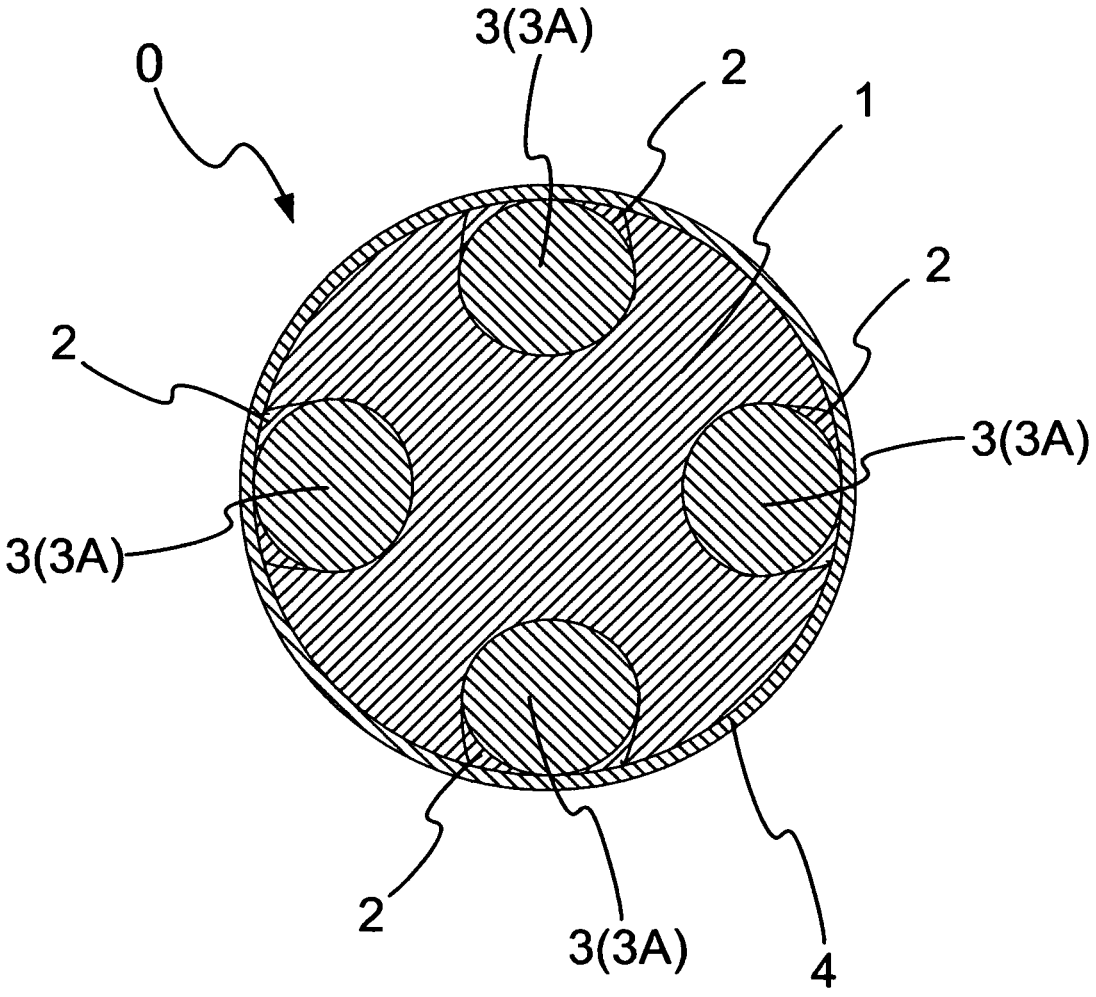
FIG. 13 depicts a transverse cross-sectional view of a third embodiment of an electric wire.

Here, the same explanations as in the previous embodiments are omitted and the different things are mainly explained. FIG. 13 shows a third embodiment of the electric wire. As shown in this figure, an electric wire 0 is composed of a conductive wire 1. The conductive wire 1 has an approximately circular cross-sectional shape. On the conductive wire 1, grooves 2 are formed along the longitudinal direction of the conductive wire 1.

In the grooves 2, additional wires 3 are inserted. Thus, the additional wires 3 are also provided in the conductive wire 1 along the longitudinal direction of the electric wire 1. The additional wire 3 is composed of a conductive member 3A. In this embodiment, the conductive member 3A is directly in contact with the conductive wire 1. Furthermore, in this embodiment, the conductive wire 1 and the conductive member 3A are made of different materials. The inventor discovered that if the additional wire 3 composed of a different material from a material constituting the conductive wire 1 is embedded in the conductive wire 1, the electric wire 0 obtained has a property that the resistance of the electric wire 0 increases less gradually than traditional conductive wires. In other word, an increase of the resistance of the conductive wire 0 is suppressed when the temperature of the conductive wire 0 increases. Therefore, the conductive wire 0 of this embodiment has relatively lower resistance at a high temperature such as 100 to 200° C. Thus, for example, in the case a motor is made with the electric wire 0, after a temperature of the motor rises, the motor can generate the same power with a lower voltage. In other word, electric power consumption of the motor containing the electric wire 0 is lower after the motor temperature rises. Therefore, an electric vehicle equipped with a motor containing the electric wire 0 can drive a longer distance than an electric vehicle equipped with a traditional motor. Although the reason why the increase of the resistance of the electric wire 0 is suppressed is unknown, the inventor speculates that the electricity may selectively flow at the best place in the electric wire 0 according to the temperature.

To obtain the above advantage better, it is preferable that the conductive wire 1 and the conductive member 3A are made of materials containing copper or aluminum as long as both are made of different materials. It is more preferable that the conductive wire 1 is made of a material containing aluminum and the conductive member 3A is made of a material containing copper. The inventor discovered that the resistance increase according to the temperature rise is most effectively suppressed when the materials of the conductive wire 1 and the conductive member 3A are this combination.

In other embodiment, the conductive member 3A may be coated with a conductive material different from the material constituting the conductive member 3A. This can also decrease the resistance of the electric wire 0. As a coating material, silver is suitable. Silver-plated copper wire is particularly suitable as a conductive member 3A.

As shown in FIG. 13, the conductive wire 1, in which the additional wires 3 are embedded, is coated with an insulator sheath 4.

Figure 25:
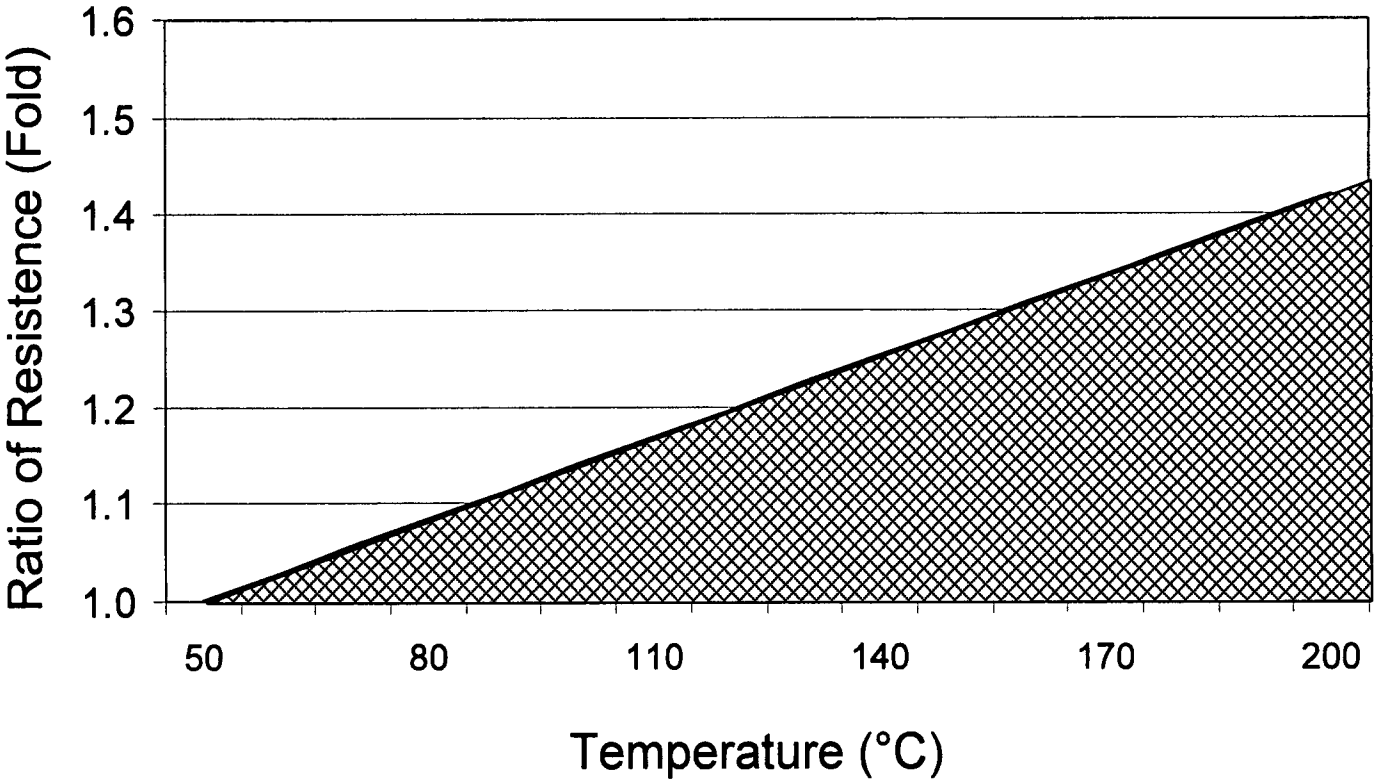
FIG. 25 is a graph and region showing a relation of temperature and ratio of resistance on an electric wire.

In order to use the electric wire 0 for a motor that becomes a high temperature, it is optimal that the electric wire 0 fulfils following property. First, a resistance of the electric wire 0 at 200° C. is at most 1.42 times larger than a resistance of the electric wire at 50° C. Electric power consumption of a motor containing such wire doesn't increase very much even after the temperature of the motor becomes high. Although not limited, the lower limit of the resistance may be set as 1.00 times larger. Moreover, when resistances of the electric wire 0 is measured at every 10° C. between 50° C. and 200° C. and then ratios of resistances at the measured temperature to the resistance measured at 50° C. are plotted so that an X axis represents the temperature in ° C. and a Y axis represents the ratio of resistance, it is desirable that a slope is at most 0.0028. Resistance of such electric wire 0 doesn't increase much even after the temperature of the electric wire 0 has become high. The slope is obtained for example by linear regression. Although not limited, the lower limit of the slope may be set as 0.0000. Furthermore, when resistances of the electric wire 0 is measured at 50° C. and at a certain temperature between 60° C. and 200° C. and an increase of a resistance of the electric wire in fold is plotted against the temperature, it is more preferable that the increase of the resistance of the electric wire is inside of a hatched area shown in FIG. 25. Such electric wire 0 has a relatively lower resistance at a high temperature. Thus, such electric wire 0 is very suitable for a motor or an electric device whose temperature becomes high. The following equation represents the hatched area shown in FIG. 25.

$$R \leq 0.0028t + 0.86$$

Here, t is a temperature in ° C., at which a resistance of the electric wire is measured. R is a ratio of a resistance at the measured temperature to a resistance measured at 50° C. It is optimal that resistances of the electric wire 0 fulfill the above equation when the resistances of the electric wire 0 are measured at every 10° C. between 50° C. and 200° C. Such electric wire 0 has lower resistance in a wide range of temperature. Therefore, electric power consumptions of a motor containing such electric wire 0 become more consistent in a wide range of temperature. Although not limited, the equation may be set as '$1 \leq R \leq 0.0028t + 0.86$'. It is not to mention that the above preferred value, slope, area and equation is not only applied to the electric wire 0 in the present embodiments but also any other electric wire.

<Modification Examples>

Figure 14:
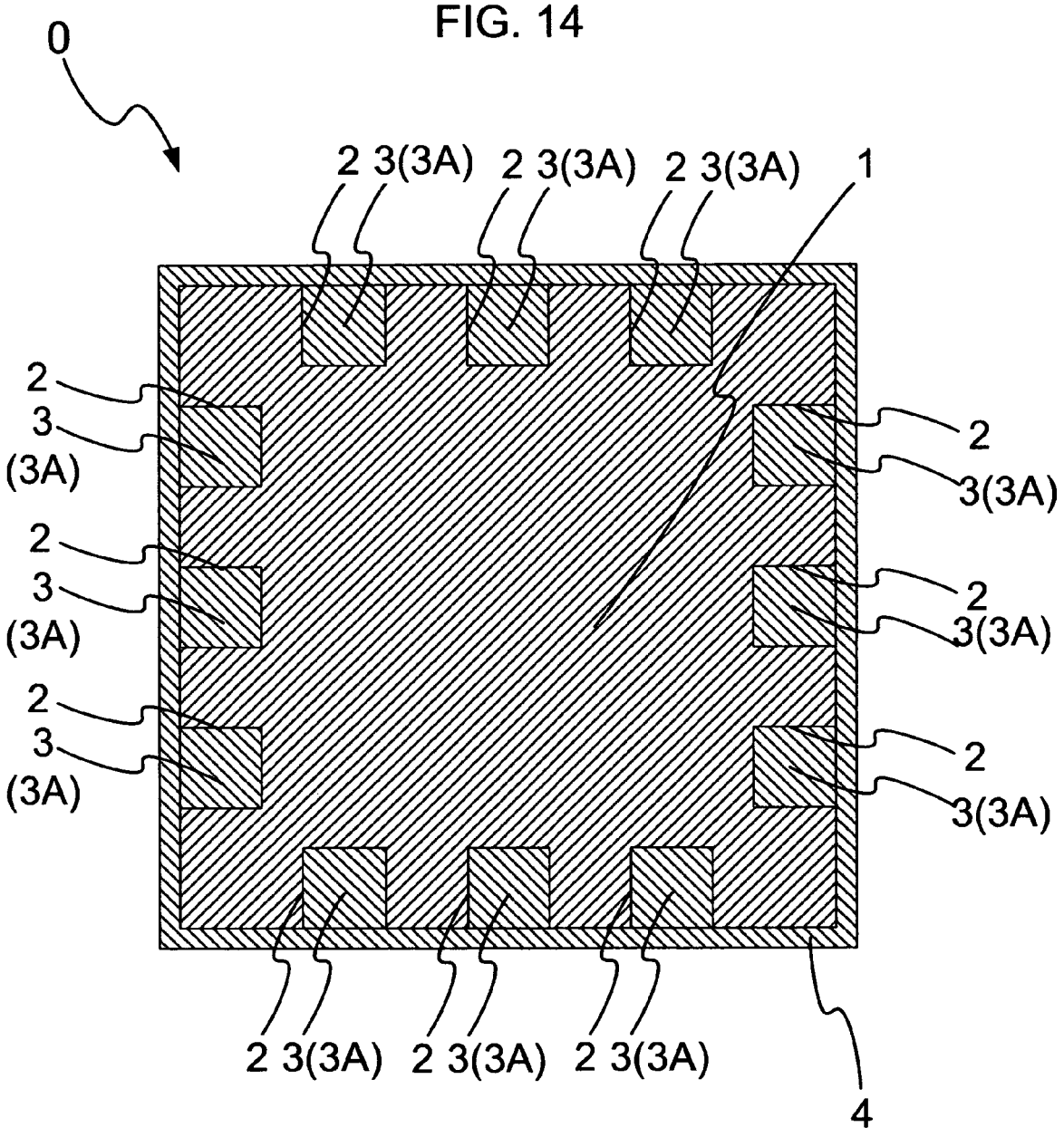
FIG. 14 depicts a transverse cross-sectional view of a first modification example of the third embodiment.
Figure 15:
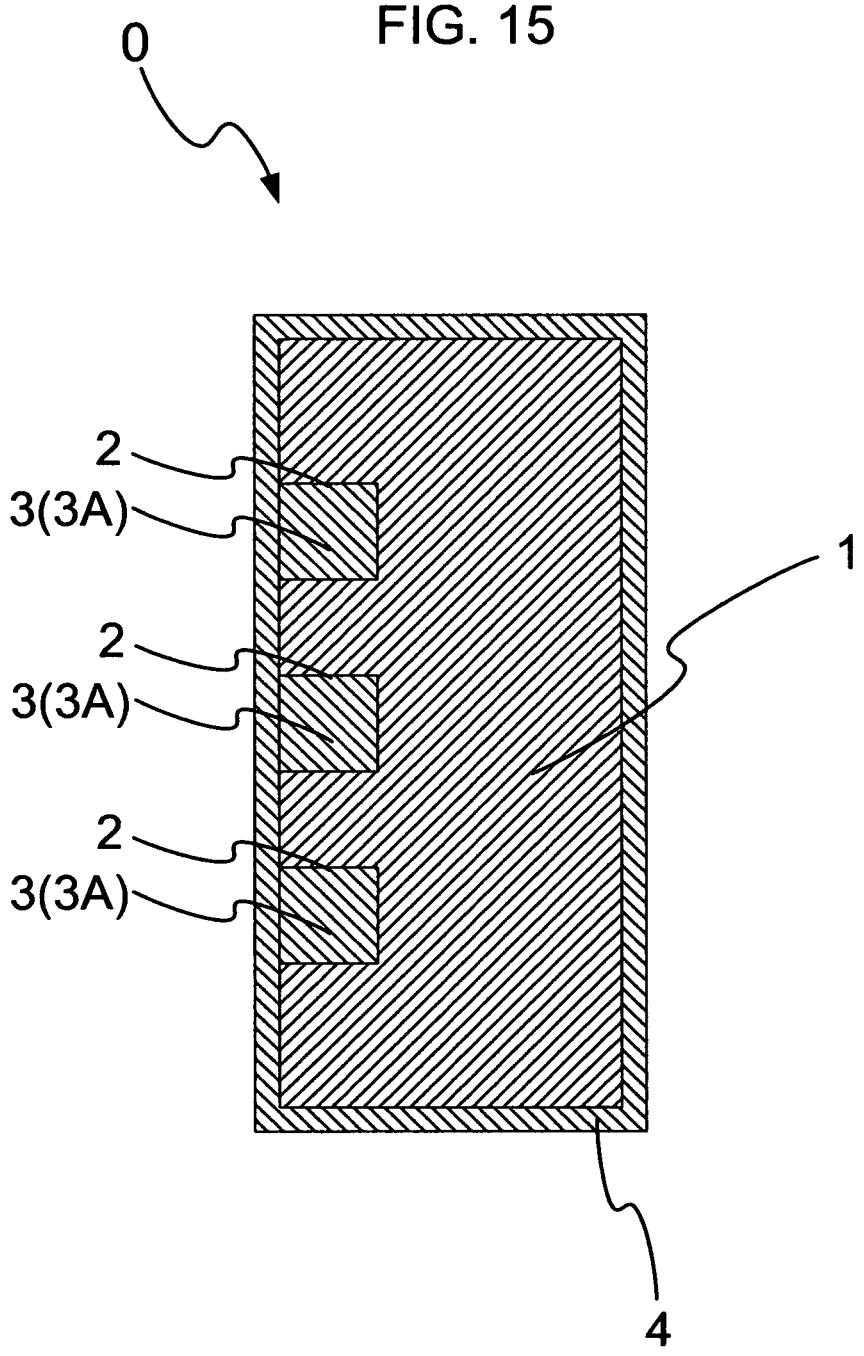
FIG. 15 depicts a transverse cross-sectional view of a second modification example of the third embodiment.
Figure 16:
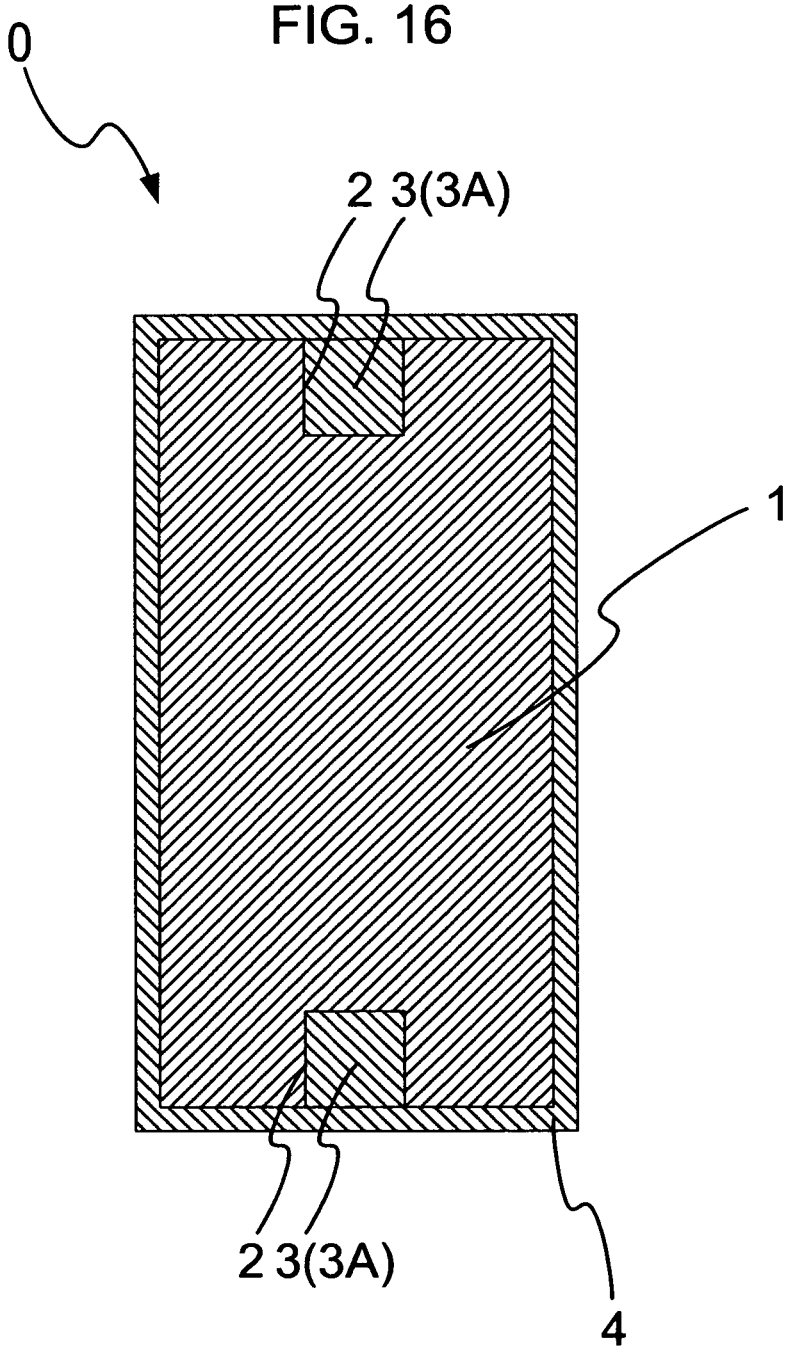
FIG. 16 depicts a transverse cross-sectional view of a third modification example of the third embodiment.
Figure 17:
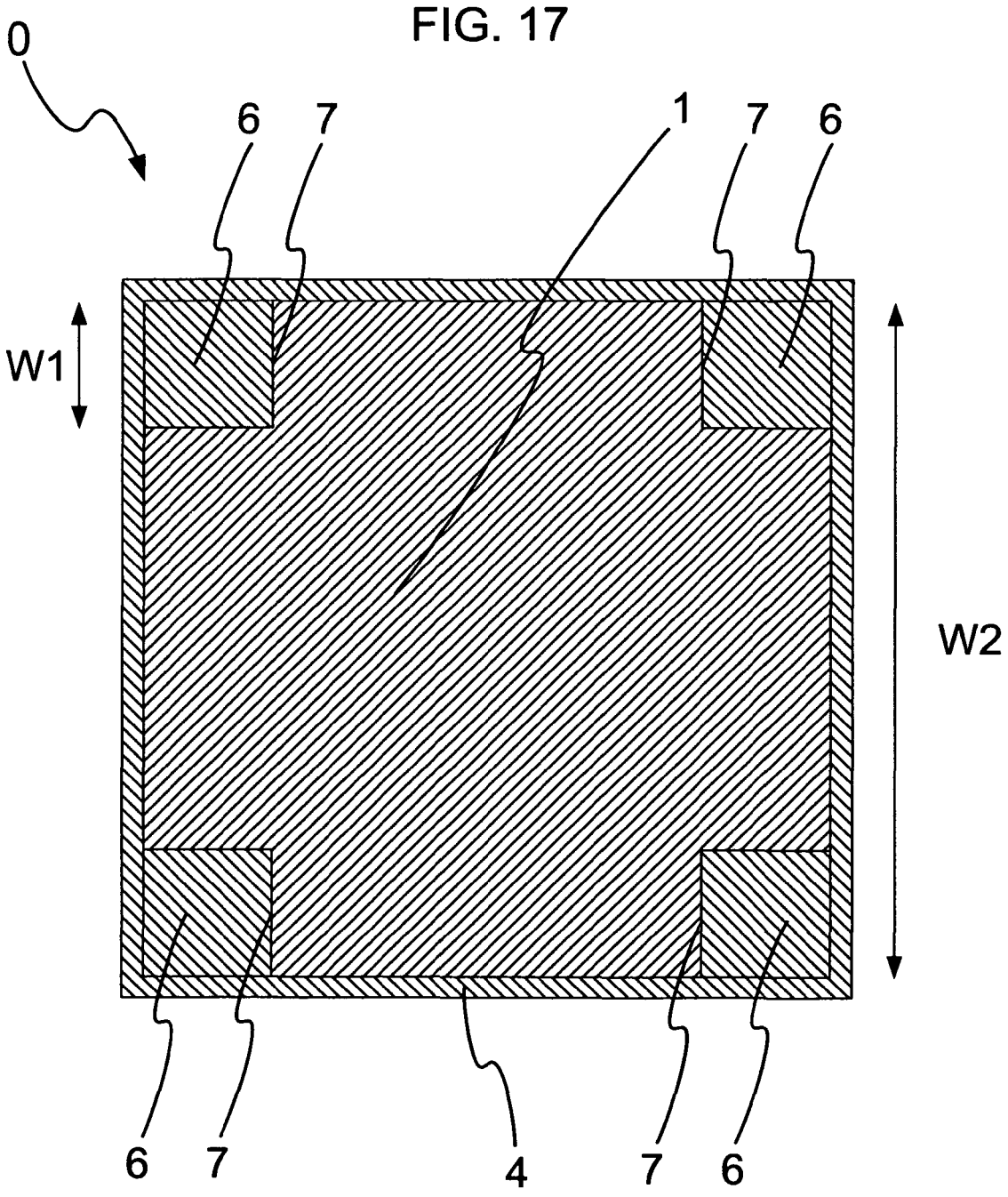
FIG. 17 depicts a transverse cross-sectional view of a fourth embodiment of an electric wire.

FIG. 14 shows a first modification example of the third embodiment. As shown in this figure, a conductive wire 1, grooves 2 and additional wires 3 have square cross-sectional shapes. Square shapes are easy to reduce dead spaces and increase contact areas. Since the grooves 2 and the additional wires 3 have square cross-sectional shapes, dead spaces inside of the electric wire 1 is reduced and the contact areas between the additional wires 3 and the conductive wire 1 are increased. Furthermore, when a coil is wound with the electric wire 0 of the first modification example, the electric wire 0 is packed more densely. FIG. 15 shows a second modification example of the third embodiment. An electric wire 0 of the second modification has a rectangular cross-sectional shape. Grooves 2 and additional wires 3 are placed on one long edge of the rectangular. FIG. 16 shows a third modification example of the third embodiment. An electric wire 0 of the third modification has a rectangular cross-sectional shape. A groove 2 and an additional wire 3 is placed on each short edge of the rectangular so that the two grooves 2 and the two additional wires 3 face to each other. The advantages of these electric wires 0 are the same as described before.

<Fourth Embodiment>

FIG. 14 shows a fourth embodiment of the electric wire. Here, the same explanations as in the previous embodiments are omitted and the different things are mainly explained. As shown in this figure, an electric wire 0 is composed of a conductive wire 1. The conductive wire 1 has an approximately square cross-sectional shape. Each corner of the conductive wire 1 is cut out along the longitudinal direction of the conductive wire 1. Thereby, on each corner of the conductive wire 1, a groove (cutout) 7 is formed along the longitudinal direction of the conductive wire 1. The groove 7 has a square cross-sectional shape. In the groove 7, an insulator 6 is placed. In other word, the groove 7 is filled with the insulator 6. The insulator 6 also has a square cross-sectional shape. The outer surface of the conductive wire 1 is coated with an insulator sheath 4.

In the case of an electric wire that has a quadrilateral cross-sectional shape, the inventor has discovered that the electric discharge mainly occurs at the corner of the electric wire when the electric wires are packed densely. Then, the inventor also discovered that if insulators are placed at the corners of the quadrilateral along the longitudinal direction of the electric wire, the electric discharges are effectively prevented. Thus, the electric wire 0 of this embodiment can prevent electric discharge effectively even when the electric wire 0 is packed densely. Therefore, when a coil is wound with the electric wire 0, a higher voltage can be applied to this coil.

The discharge is well prevented even if a width W1 of the insulator 6 is less than one third of a width W2 of the conductive wire 1. If the width W1 of the insulator 6 is set less than one third of a width W2 of the conductive wire 1, an cross-sectional area of the conductive wire 1 doesn't have to become so small that the conductive wire 1 can still conduct a large current. Because of the same reason, it is also preferable that a width W1 of the groove 7 is less than one third of a width W2 of the conductive wire 1.

It is preferable that the insulator 6 is made of a synthetic resin. Synthetic resin provides an excellent insulation even if the insulator 6 is thin. Furthermore, synthetic resin adheres well to many metals.

The insulator sheath 4 may be made of the same or different material from the material of the insulator 6. However, if the insulator sheath 4 is made of the same material as the material of the insulator 6, adhesiveness between the insulator 6 and the insulator sheath 4 is improved.

Figure 18:
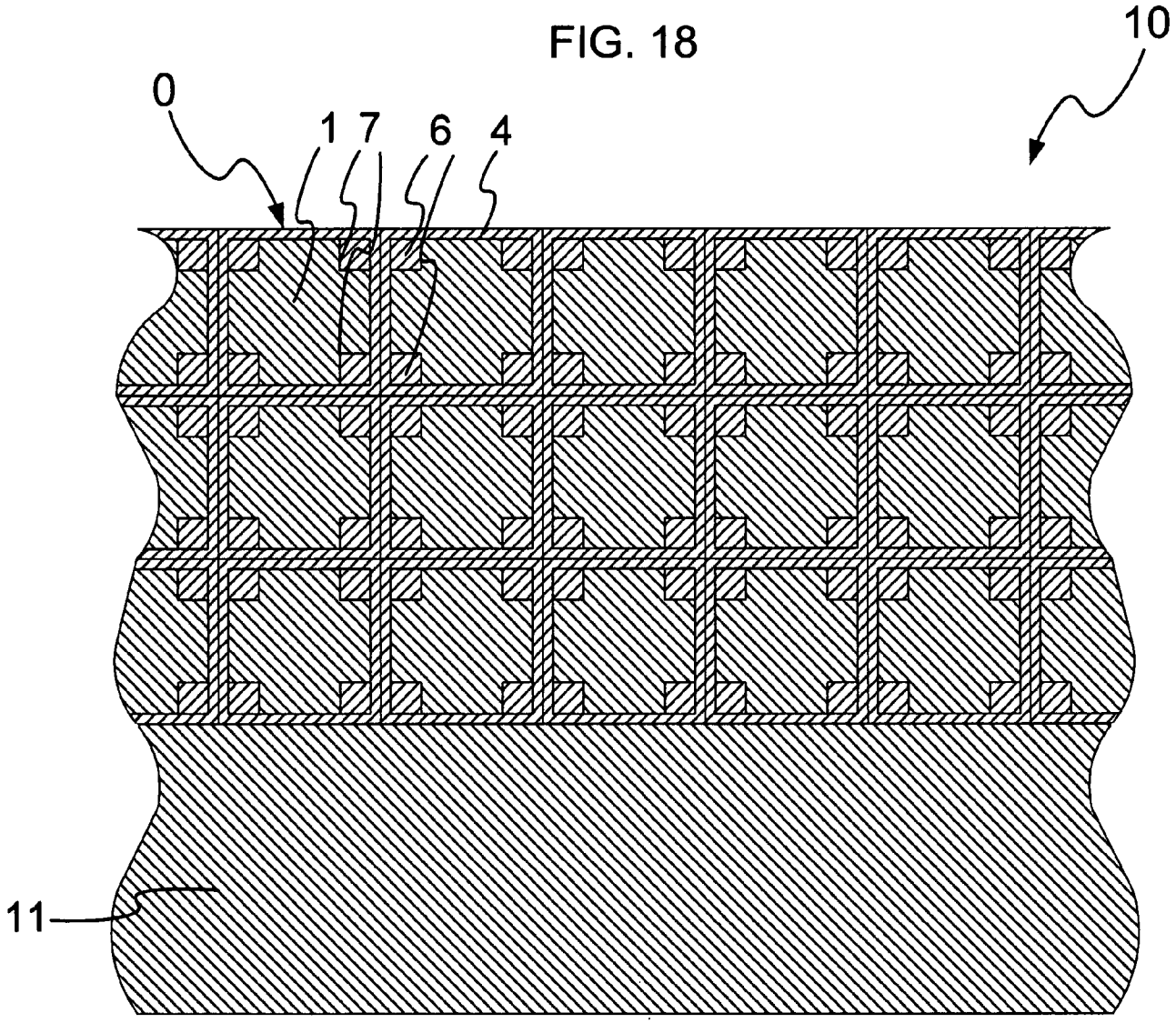
FIG. 18 depicts an enlarged longitudinal cross-sectional view of a coil containing the electric wire shown in FIG. 17.

FIG. 18 shows a part of a coil, in which the electric wire 0 is wound with a best arrangement. This figure shows an enlarged longitudinal cross-sectional view of the coil. More specifically, the electric wire 0 is wound on an outer surface of a cylindrical bobbin 11. After the coil 10 is sectioned in a longitudinal direction of the cylindrical bobbin 11 and one end section is magnified, the coil 10 is seen as FIG. 18. In this figure, a right and left direction is the longitudinal direction of the cylindrical bobbin 11. An upward direction is the circumferential direction of the cylindrical bobbin 11. And, a downward direction is the center direction of the cylindrical bobbin 11. For convenience, the right and left direction of the FIG. 18 is called longitudinal direction and the upward and downward direction is called circumferential direction.

As shown in FIG. 18, the electric wire 0 is arranged so that the electric wire 0 aligns on one line in both longitudinal and circumferential directions. In other words, the electric wire 0 is arranged so that it forms columns and rows in cross-sectional view. This arrangement maximizes the density of the electric wire 0. As shown in FIG. 18, each edge of the electric wire 0 is arranged to be on one line in both longitudinal and circumferential directions. Thus, one corner of one square is adjacent to one corner of next three squares. In other word, four corners come together at a junction of a grid formed by edges of the quadrilateral. In this arrangement, the four insulators 6 become adjacent to one another at the junction. This arrangement effectively prevents electric discharge from the corner of the electric wire 0. Therefore, a higher voltage can be applied to the coil 10. Thus, a larger power can be generated if the coil 10 is used for a motor. In addition, since the wire density is high, the coil 10 can be compact to obtain a sufficient inductance or to generate a sufficient magnetic force.

<Modification Examples>

Figure 19:
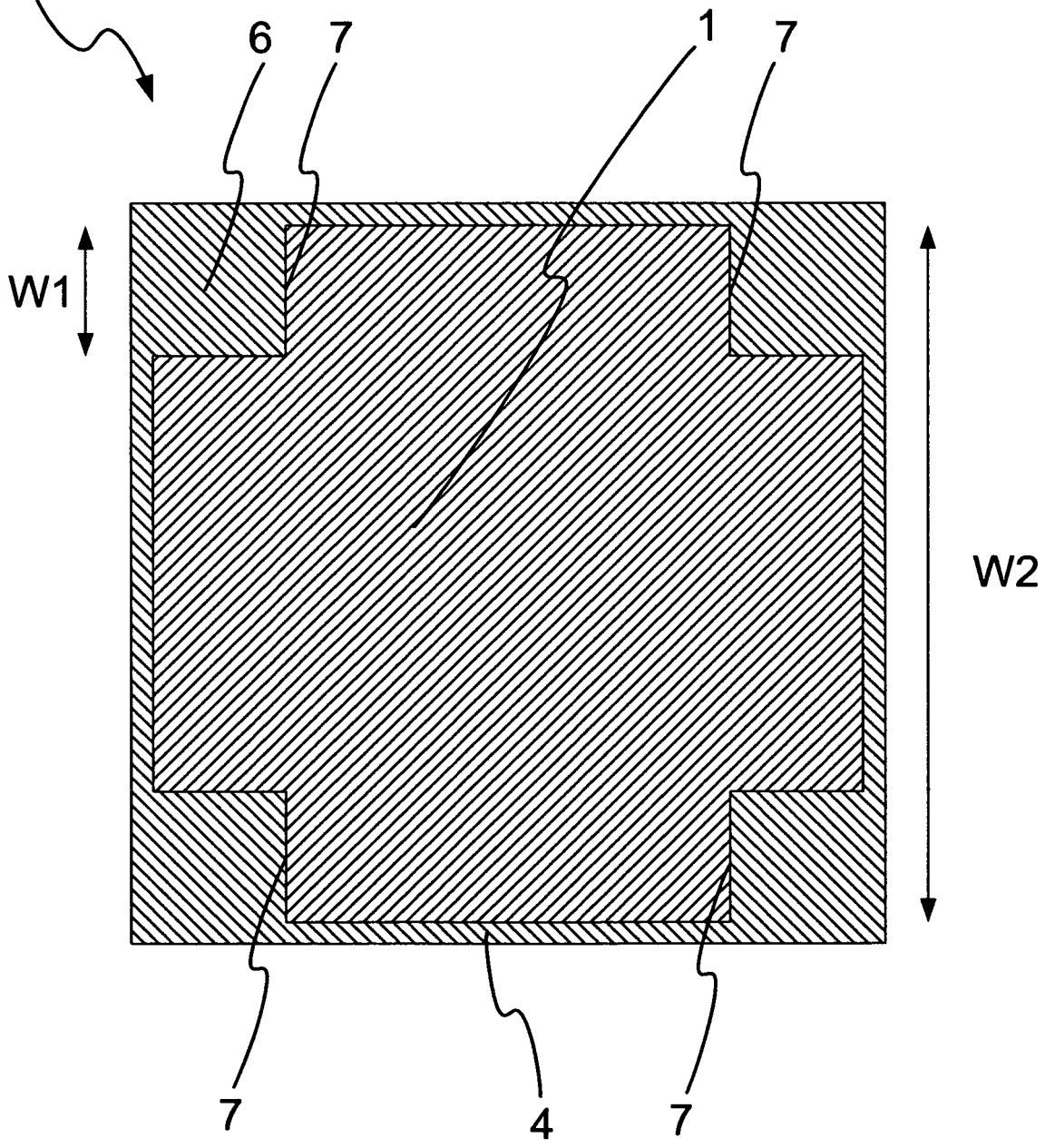
FIG. 19 depicts a transverse cross-sectional view of a first modification example of the fourth embodiment.

FIG. 19 shows a first modification example of the fourth embodiment. As shown in this figure, in an electric wire 0, an insulator 6 that fills grooves 2 and an outer surface of the conductive wire 1 is formed together. In other word, in this modification example, the insulator sheath 4 is united into the insulator 6. This arrangement makes the manufacturing process of the electric wire 0 simpler.

Figure 20:
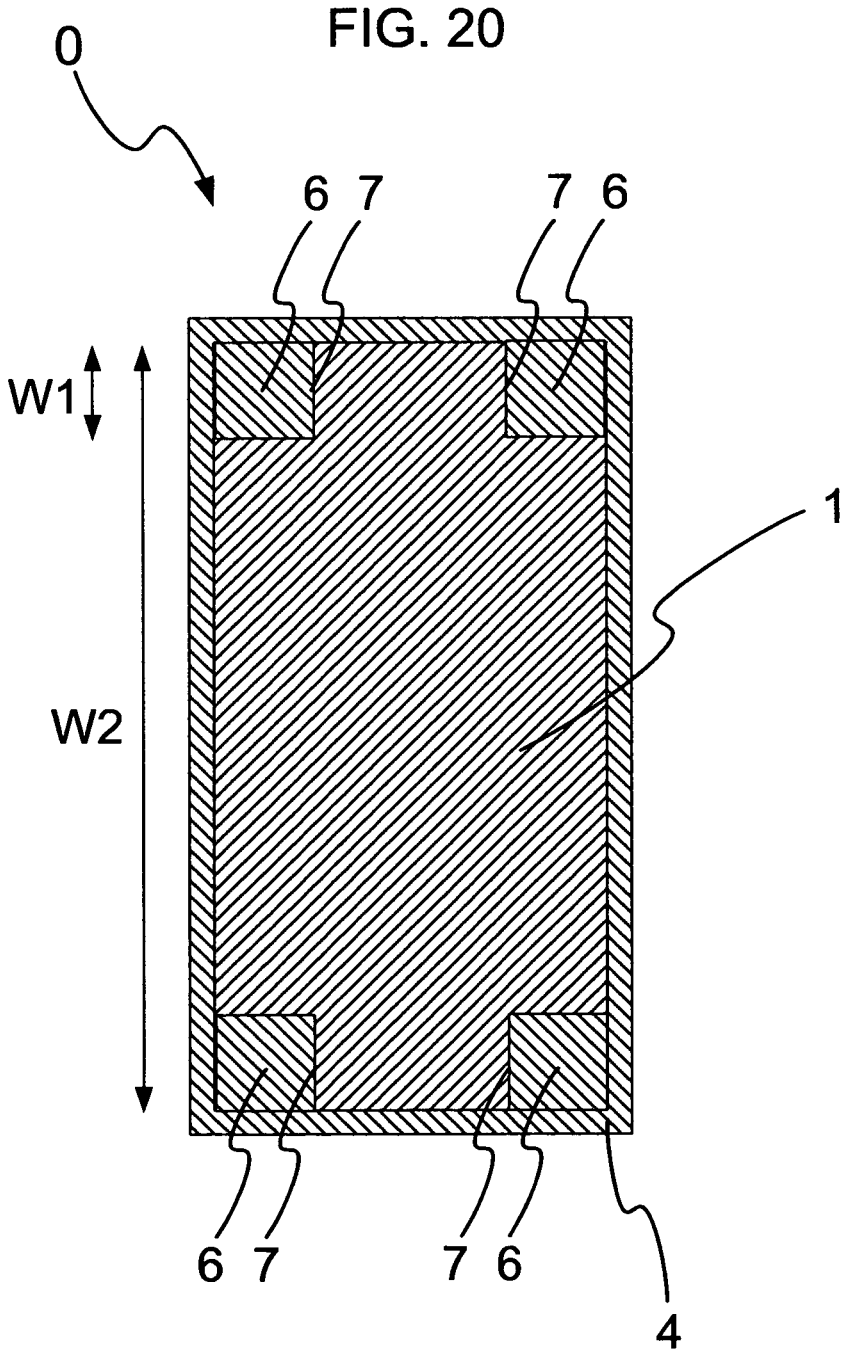
FIG. 20 depicts a transverse cross-sectional view of a second modification example of the fourth embodiment.

FIG. 20 shows a second modification example of the fourth embodiment. An electric wire 0 of the second modification has a rectangular cross-sectional shape. When a conductive wire 1 has a rectangular cross-sectional shape, width W2 of the conductive wire 1 may be based on a longer edge of the conductive wire 1.

Figure 21:
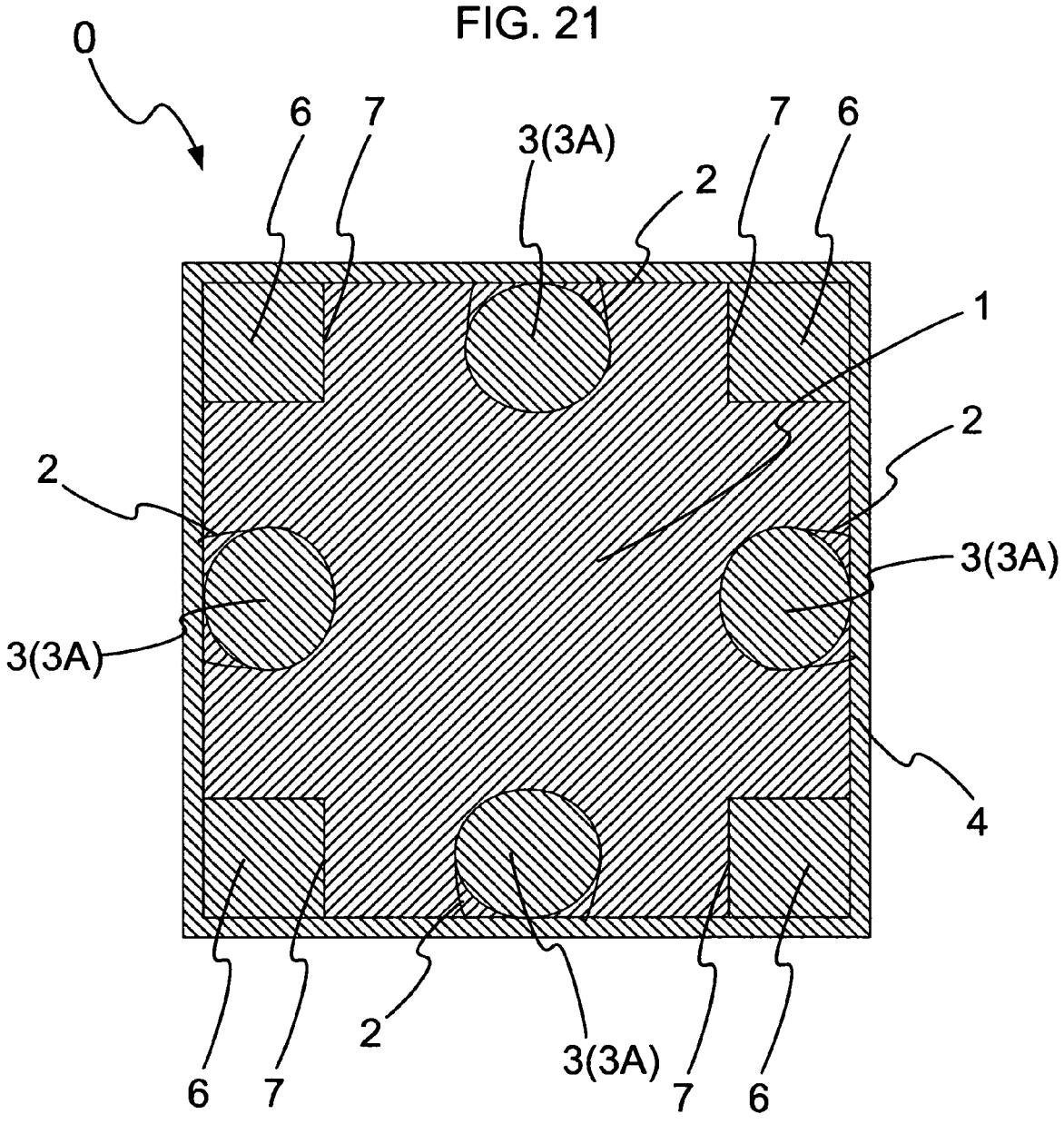
FIG. 21 depicts a transverse cross-sectional view of a third modification example of the fourth embodiment.

FIG. 21 shows a third modification example of the fourth embodiment. As shown in this figure, on each corner of the conductive wire 1, a groove 7 is formed along the longitudinal direction of the conductive wire 1. In addition, grooves 2 are formed on the edges of the square. The position of these grooves 2 are approximately at the middle of the edge and distant from the corner. In the groove 7, an insulator 6 is placed. In the groove 2, an additional wire 3 is placed. Therefore, in the electric wire 0 of this modification example, an increase of the resistance is well suppressed at high temperature. In addition, electric discharge from the corner of the electric wire 0 is well prevented. Therefore, at a high temperature not only a motor containing the electric wire 0 of this modification example can suppress the elevation of the electric power consumption effectively, but a high voltage can also be applied to the motor. Accordingly, such motor can generate a larger mechanical power with a relatively lower electric power consumption at a high temperature.

Figure 22:
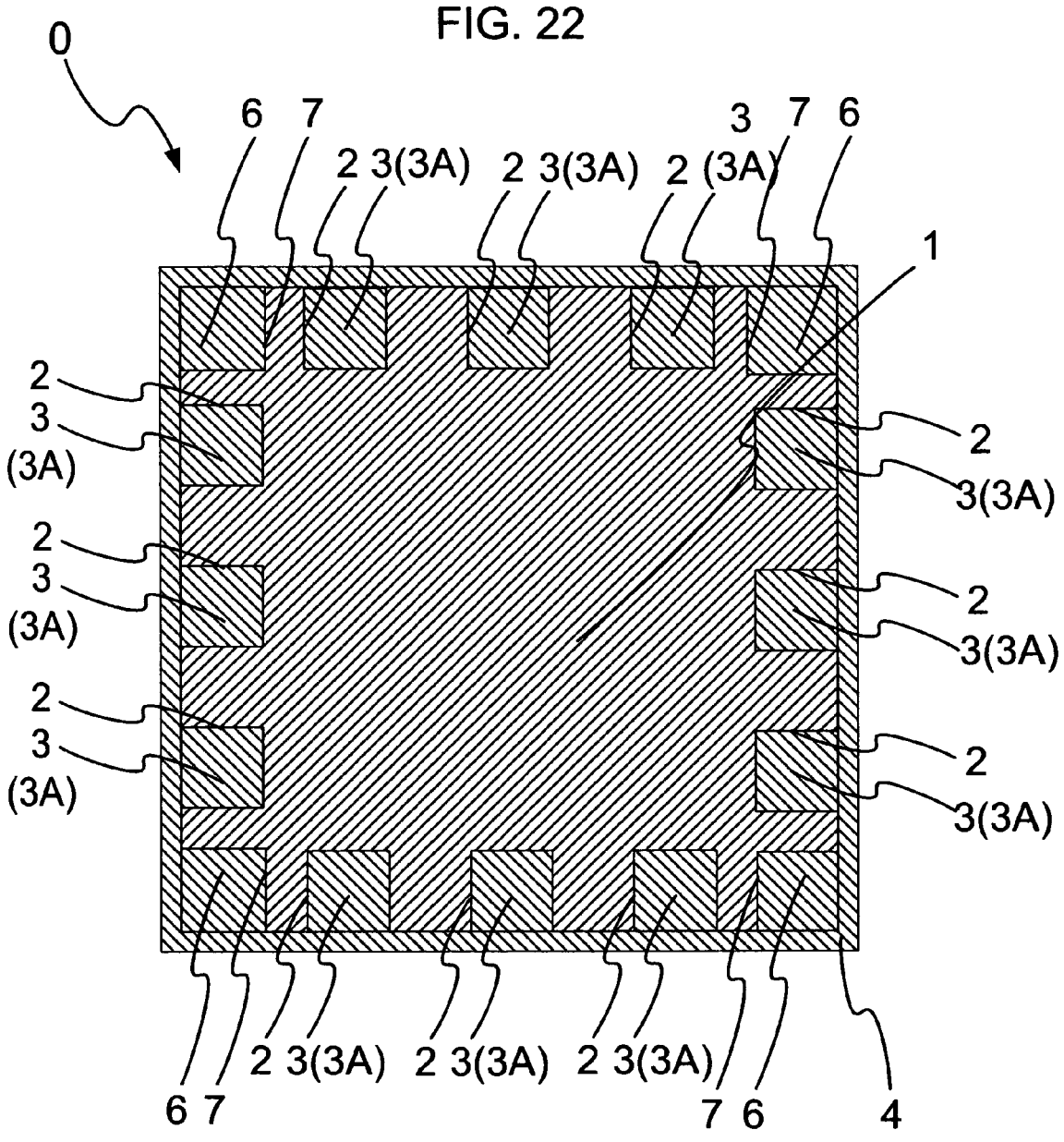
FIG. 22 depicts a transverse cross-sectional view of a fourth modification example of the fourth embodiment.

FIG. 22 shows a fourth modification example of the fourth embodiment. As shown in this figure, all the grooves 2 and 7, additional wires 3 and insulators 6 have square cross-sectional shapes. Like this example, if the grooves 2 and the grooves 7 have a similar cross-sectional shape, a process of forming grooves becomes simpler.

Figure 23:
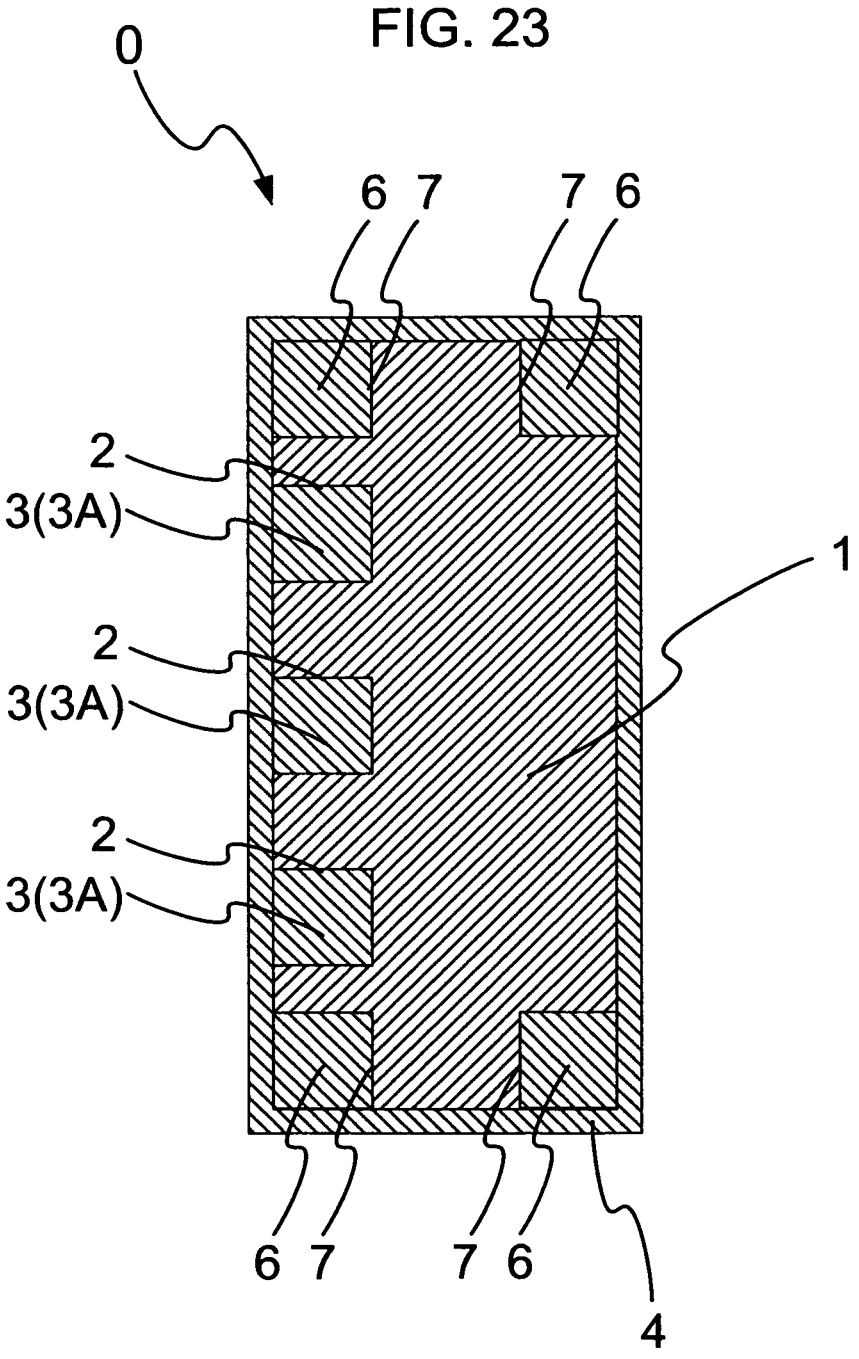
FIG. 23 depicts a transverse cross-sectional view of a fifth modification example of the fourth embodiment.

FIG. 23 shows a fifth modification example of the fourth embodiment. An electric wire 0 of the fourth modification has a rectangular cross-sectional shape. Grooves 7 and insulators 6 are placed at all the corners of the rectangular. Grooves 2 and additional wires 3 are placed on one long edge of the rectangular. The advantages of electric wires 0 are a combination of the advantages described before.

In the above embodiments, the quadrilateral shapes are rectangular or square. In other embodiments, a quadrilateral shape may be a quadrilateral shape that is not rectangular or square. In other embodiment, the insulator 6 may be placed at one, two or three corners of the quadrilateral. In other embodiment, a cross-sectional shape of the groove 7 and the insulator 6 may be other shape such as circular.

<Example>

An electric wire 0 as shown in FIG. 13 was made. As a conductive wire 1, an aluminum (Al) wire (Φ2 mm) was prepared. And, as additional wires 3, copper (Cu) wires (Φ0.2 mm) were prepared. On the aluminum wire, four grooves 2 were formed by a blade. Then, the copper wires were put into the groove 2.

Figure 24:
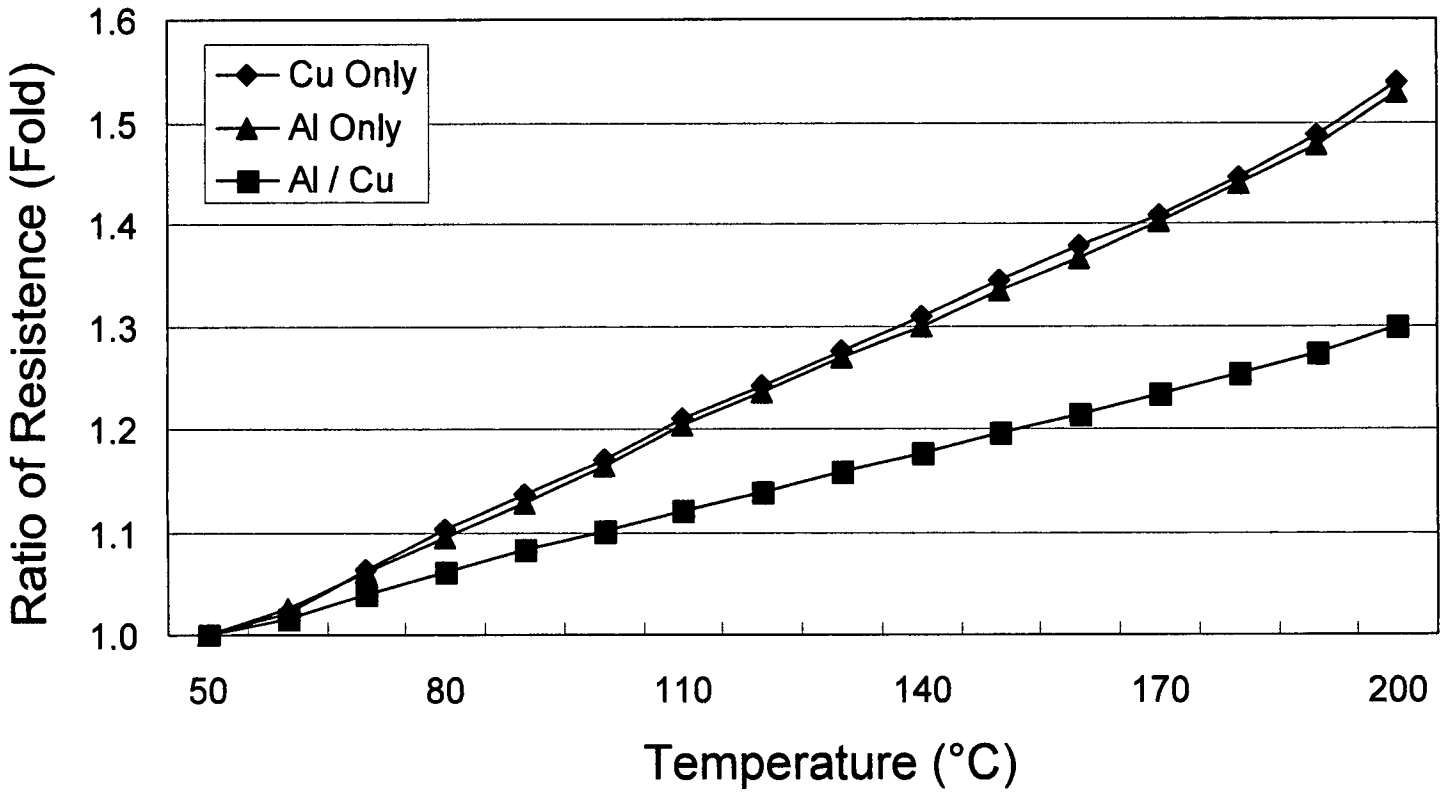
FIG. 24 is a graph showing a relation of temperature and ratio of resistance measured on the electric wire of an example.

Then, the temperature of the electric wire 0 was slowly raised. And, resistances of the electric wire 0 were measured between 50° C. and 200° C. at every 10° C., applying a direct current (DC). Then, ratios of the resistances at the measured temperature to the resistance at 50° C. were calculated. The result is shown in FIG. 24.

As a comparison, resistances of an aluminum wire (Φ2 mm) and a copper wire (Φ2 mm) were measured in the same way. And, ratios of the resistances at the measured temperature to the resistance at 50° C. were also calculated. The results are also shown in FIG. 24.

As shown in this figure, the resistance of the aluminum wire, in which the copper wires were embedded, didn't increase as much as those of the aluminum wire and the copper wire as the temperature of the wire rose. Therefore, it is expected that a motor containing the electric wire 0 of this example will generate the same power with a lower voltage than motors containing the aluminum wire or the copper wire at a high temperature such as 100 or 200° C.

What is claimed is:

[1. An electric wire comprising:

a conductive wire, which has substantially a quadrilateral cross-sectional shape; and an insulator placed along a longitudinal direction of the conductive wire at a corner of the quadrilateral;

a groove provided along the longitudinal direction of the conductive wire at the corner of the quadrilateral;

wherein the insulator is placed in the groove.]

[2. The electric wire of claim 1, wherein a width of the insulator is less than one third of a width of the conductive wire.]

[3. The electric wire of claim 1, wherein the insulator is made of a synthetic resin.]

[4. The electric wire of claim 1, wherein insulators are placed at all corners of the quadrilateral.]

[5. The electric wire of claim 1, further comprising:

an additional wire inserted in the conductive wire along the longitudinal direction of the conductive wire;

wherein the additional wire comprises a conductive member;

wherein the conductive wire and the conductive member are made of different materials; and wherein the conductive member is in contact with the conductive wire.]

[6. A coil comprising the electric wire of claim 1, the electric wire being wound on a bobbin so that a corner of a quadrilateral is adjacent to a corner of a next quadrilateral in a cross sectional view.]

*7. An electric wire comprising:*

*a conductive wire having substantially a quadrilateral cross-sectional shape;*

*a groove provided along a longitudinal direction of the conductive wire at each corner of the quadrilateral, wherein an insulator is placed into the groove along the longitudinal direction of said conductive wire;*

*an additional wire, comprising a conductive member, inserted into the conductive wire along the longitudinal direction of said conductive wire, wherein said additional wire is sized to fit into another groove located around a middle point of each sides of said quadrilateral; and*

*an insulator sheath covering entirely an outer surface of the conductive wire, covering all sides and all corners of the quadrilateral,*

*wherein:*

*the conductive wire and the additional wire are made of different materials, and the conductive member is in direct contact with the conductive wire.*

*8. The electric wire of claim 7, wherein the conductive wire is made of materials comprising aluminum and the conductive member is made of material comprising copper.*

*9. The electric wire of claim 7, a resistance of the conductive wire at 200° C. is at most 1.42 times and at least 1.00 time larger than a resistance of the conductive wire at 50° C.*

*10. An electric wire comprising:*

*a conductive wire having substantially a quadrilateral cross-sectional shape;*

*a groove provided along a longitudinal direction of the conductive wire;*

*an additional wire, comprising a conductive member, inserted into the conductive wire along the longitudinal direction of said conductive wire, said additional wire is sized to fit into the groove so as to fill entirely the groove;*

*an insulator placed along the longitudinal direction of the conductive wire covering entirely an outer surface of said conductive wire,*

*wherein:*

*the conductive wire and the additional wire are made of different materials,*

*the conductive member is in direct contact with the conductive wire, and*

*a ratio of resistance of the conductive wire at a temperature measured between 50° C. to 200° C. to the resistance of conductive wire measured at 50° C. satisfy the following equation:*

$$1 \leq R \leq 0.028T + 0.86$$

*wherein T is the temperature at which the resistance of said electric wire is measured.*

*11. The electric wire of claim 10, wherein the conductive wire is made of materials comprising aluminum.*

*12. The electric wire of claim 10, wherein said conductive member is made of materials comprising copper.*

*13. The electric wire of claim 10, wherein the insulator is made of a synthetic resin.*

*14. The electric wire of claim 10, wherein a surface of said conductive member is coated with a conductive material different from material constituting the conductive member.*

*15. The electric wire of claim 12, wherein the conductive member comprises a silver-plated copper wire.*

*16. An electric wire comprising:*

*a single conductive wire having substantially a quadrilateral cross-sectional shape; and*

*an insulating layer placed along a longitudinal direction of said single conductive wire, covering at least one corner of said quadrilateral,*

*wherein:*

*a thickness of the insulating layer at the corner is thicker than a thickness of the insulating layer at a side of said quadrilateral, and*

*a resistance of the conductive wire at 200° C. is at most 1.42 times larger than a resistance of the conductive wire at 50° C.*

*17. The electric wire of claim 16, wherein the resistance of the conductive wire at 200° C. is at least 1.00 times larger than the resistance of the conductive wire at 50° C.*

*18. The electric wire of claim 16, wherein a ratio of resistance of the conductive wire measured at a temperature between 50° C. to 200° C. to the resistance of conductive wire measured at 50° C. satisfies the following equation:*

$$1 \leq R \leq 0.028T + 0.86$$

*wherein T is the temperature at which the resistance of said electric wire is measured.*

*19. The electric wire of claim 16 further comprising an additional wire inserted in the conductive wire along the longitudinal direction of the conductive wire,*

*wherein:*

*the additional wire comprises a conductive member;*

*the conductive wire and the conductive member are made of different materials; and*

*the conductive member is in direct contact with the conductive wire.*

*20. The electric wire of claim 19, wherein the conductive wire is made of materials comprising aluminum and the conductive member is made of materials comprising copper.*

*21. A coil comprising the electric wire of claim 16, wherein the electric wire being wound on a bobbin so that a corner of a quadrilateral is adjacent to a corner of a next quadrilateral in a cross sectional view.*

*22. The electric wire of claim 16, wherein the insulating layer covers entirely an outer surface of the conductive wire, covering all corners and all sides of the quadrilateral.*

*23. The electric wire of claim 16, wherein the insulating layer is made of synthetic resin.*

*24. The electric wire of claim 16 further comprises a groove disposed along the longitudinal direction of the conductive wire at one corner of the quadrilateral, wherein the insulating layer covers the groove.*

*25. The electric wire of claim 24, wherein the groove is provided at all corners of the quadrilateral and the insulating layer covers entirely an outer surface of the conductive wire, including all corners and all sides of the quadrilateral.*

* * * * *